(12) United States Patent
Carver et al.

(10) Patent No.: US 9,786,442 B2
(45) Date of Patent: *Oct. 10, 2017

(54) ENERGY STORAGE DEVICE

(71) Applicant: Carver Scientific, Inc., Baton Rouge, LA (US)

(72) Inventors: David Carver, Baton Rouge, LA (US); Robert Carver, Austin, TX (US); Sean Reynolds, Baton Rouge, LA (US); Noah Davis, Baton Rouge, LA (US); Sean Hall, Baton Rouge, LA (US)

(73) Assignee: Carver Scientific, Inc., Baton Rouge, LA (US)

( * ) Notice: Subject to any disclaimer, the term of this patent is extended or adjusted under 35 U.S.C. 154(b) by 76 days.

This patent is subject to a terminal disclaimer.

(21) Appl. No.: 14/780,270

(22) PCT Filed: Apr. 4, 2014

(86) PCT No.: PCT/US2014/033102
§ 371 (c)(1),
(2) Date: Sep. 25, 2015

(87) PCT Pub. No.: WO2014/161007
PCT Pub. Date: Oct. 2, 2014

(65) Prior Publication Data
US 2016/0064153 A1    Mar. 3, 2016

Related U.S. Application Data

(63) Continuation of application No. 14/156,457, filed on Jan. 16, 2014, now Pat. No. 8,940,850, and a
(Continued)

(51) Int. Cl.
*H01G 11/28* (2013.01)
*H01G 4/018* (2006.01)
(Continued)

(52) U.S. Cl.
CPC ............ *H01G 11/28* (2013.01); *H01G 4/018* (2013.01); *H01G 4/04* (2013.01); *H01G 4/206* (2013.01);
(Continued)

(58) Field of Classification Search
CPC .......... H01G 11/28; H01G 4/018; H01G 4/04; H01G 4/206; H01G 11/74; H01G 11/78; H01G 13/00; H02J 7/345; Y02T 10/7022
(Continued)

(56) References Cited

U.S. PATENT DOCUMENTS 2,145,710 A    1/1939    Clark
2,278,762 A    1/1957    Eisler
(Continued)

FOREIGN PATENT DOCUMENTS

EP    1 251 530    10/2002
EP    1 786 006    5/2007
(Continued)

OTHER PUBLICATIONS

International Search Report for PCT/US2012/072337 (dated Mar. 5, 2013).
(Continued)

*Primary Examiner* — Eric Thomas
*Assistant Examiner* — Michael P McFadden
(74) *Attorney, Agent, or Firm* — Klarquist Sparkman, LLP

(57) ABSTRACT

An energy storage device comprises a capacitor having a dielectric between opposite electrodes and a nonconductive coating between at least one electrode and the dielectric. The nonconductive coating allows for much higher voltages to be employed than in traditional EDLCs, which significantly increases energy stored in the capacitor. Viscosity of the dielectric material may be increased or decreased in a
(Continued)

controlled manner, such as in response to an applied external stimulus, to control discharge and storage for extended periods of time.

19 Claims, 14 Drawing Sheets

Related U.S. Application Data continuation-in-part of application No. 13/853,712, filed on Mar. 29, 2013, now Pat. No. 9,011,627, and a continuation-in-part of application No. 13/599,996, filed on Aug. 30, 2012, now Pat. No. 8,633,289, said application No. 13/853,712 is a continuation of application No. 12/245,665, filed on Oct. 3, 2008, now Pat. No. 8,432,663, said application No. 13/853,712 is a continuation-in-part of application No. 13/671,546, filed on Nov. 7, 2012, now abandoned.

(60) Provisional application No. 61/808,733, filed on Apr. 5, 2013, provisional application No. 61/529,436, filed on Aug. 31, 2011, provisional application No. 60/978,067, filed on Oct. 5, 2007.

(51) Int. Cl.
  *H01G 4/04* (2006.01)
  *H01G 11/78* (2013.01)
  *H01G 4/20* (2006.01)
  *H02J 7/34* (2006.01)
  *H01G 13/00* (2013.01)
  *H01G 11/74* (2013.01)

(52) U.S. Cl.
  CPC ............ *H01G 11/74* (2013.01); *H01G 11/78* (2013.01); *H01G 13/00* (2013.01); *H02J 7/345* (2013.01); *Y02T 10/7022* (2013.01)

(58) Field of Classification Search
  USPC ........................................................ 361/502
  See application file for complete search history.

(56) References Cited

U.S. PATENT DOCUMENTS

| | | |
|---|---|---|
| 2,778,762 A | 1/1957 | Eisler |
| 2,789,990 A * | 4/1957 | Bullock ............... C07C 323/00 549/39 |
| 2,798,990 A * | 7/1957 | Davis ................. H01G 4/14 156/327 |
| 3,288,728 A | 11/1966 | Gorham |
| 3,342,754 A | 9/1967 | Gorham |
| 3,397,085 A * | 8/1968 | Cariou ................. H01G 4/145 29/25.42 |
| 3,535,602 A | 10/1970 | Hrach et al. |
| 3,616,314 A | 10/1971 | Settineri et al. |
| 3,907,748 A | 9/1975 | Marvel et al. |
| 4,333,418 A | 6/1982 | Nagel et al. |
| 4,359,327 A | 11/1982 | Armand et al. |
| 4,500,562 A | 2/1985 | Jahn et al. |
| 4,532,369 A | 7/1985 | Hartner |
| 4,638,407 A | 1/1987 | Lundsgaard |
| 4,675,462 A | 6/1987 | Ungarelli et al. |
| 4,734,533 A | 3/1988 | Ungarelli et al. |
| 4,748,542 A | 5/1988 | Lundsgaard |
| 4,769,505 A | 9/1988 | Lee et al. |
| 4,795,838 A | 1/1989 | Bornengo et al. |
| 4,806,702 A | 2/1989 | Lee et al. |
| 4,816,608 A | 3/1989 | Bornengo et al. |
| 4,849,559 A | 7/1989 | Lee et al. |
| 4,853,488 A | 8/1989 | Ungarelli et al. |
| 4,886,923 A | 12/1989 | Ungarelli et al. |
| 4,942,061 A | 7/1990 | Domes |
| 4,963,429 A | 10/1990 | Norian et al. |
| 5,079,674 A | 1/1992 | Malaspina |
| 5,110,903 A | 5/1992 | Lee et al. |
| 5,144,529 A | 9/1992 | Takahashi |
| 5,266,291 A | 11/1993 | Drnevich et al. |
| 5,305,178 A | 4/1994 | Binder et al. |
| 5,636,100 A | 6/1997 | Zheng et al. |
| 5,783,933 A | 7/1998 | Bailly |
| 5,790,368 A * | 8/1998 | Naito ............... H01G 9/15 29/25.03 |
| 6,096,234 A | 8/2000 | Nakanishi |
| 6,307,735 B1 | 10/2001 | Saito |
| 6,602,741 B1 | 8/2003 | Kudoh et al. |
| 6,674,635 B1 | 1/2004 | Fife et al. |
| 6,956,417 B2 | 10/2005 | Bernstein |
| 7,033,406 B2 | 4/2006 | Weir et al. |
| 7,164,197 B2 | 1/2007 | Mao et al. |
| 7,170,260 B2 | 1/2007 | Thrap |
| 7,190,016 B2 | 3/2007 | Cahalen et al. |
| 7,197,360 B1 | 3/2007 | Moulder |
| 7,279,777 B2 | 10/2007 | Bai et al. |
| 7,342,755 B1 | 3/2008 | Horvat et al. |
| 7,429,317 B2 | 9/2008 | Paul |
| 7,495,887 B2 | 2/2009 | Cox |
| 7,542,265 B2 | 6/2009 | Tan et al. |
| 7,781,358 B2 | 8/2010 | Hackenberger et al. |
| 8,164,881 B2 | 4/2012 | Hu et al. |
| 8,289,676 B2 | 10/2012 | Giannantonio et al. |
| 8,382,042 B2 | 2/2013 | Sanderson et al. |
| 8,432,663 B2 | 4/2013 | Carver |
| 8,633,289 B2 | 1/2014 | Carver et al. |
| 8,940,850 B2 | 1/2015 | Carver et al. |
| 9,011,627 B2 | 4/2015 | Carver |
| 9,087,645 B2 | 7/2015 | Holme et al. |
| 9,214,280 B2 | 12/2015 | Carver et al. |
| 9,531,198 B2 | 12/2016 | Carver |
| 2004/0210289 A1 | 10/2004 | Wang et al. |
| 2005/0029515 A1 | 2/2005 | Nagai et al. |
| 2005/0186437 A1 | 8/2005 | Pramanik |
| 2006/0034035 A1 | 2/2006 | Maruo |
| 2006/0065045 A1 | 3/2006 | Borwick, III et al. |
| 2006/0074164 A1 | 4/2006 | Slenes et al. |
| 2006/0182973 A1 | 8/2006 | Lee et al. |
| 2006/0191443 A1 | 8/2006 | Yamaguchi et al. |
| 2007/0108490 A1 | 5/2007 | Tan et al. |
| 2007/0117886 A1 | 5/2007 | Tan et al. |
| 2007/0232017 A1 | 10/2007 | Baniecki et al. |
| 2008/0171230 A1 | 7/2008 | Zou et al. |
| 2008/0180876 A1 | 7/2008 | Shimanouchi et al. |
| 2008/0293864 A1 | 11/2008 | Tan et al. |
| 2009/0090999 A1 | 4/2009 | Carver |
| 2009/0312474 A1 | 12/2009 | Tan et al. |
| 2010/0002362 A1 | 1/2010 | Clelland et al. |
| 2010/0033899 A1 | 2/2010 | Koh et al. |
| 2010/0079926 A1 | 4/2010 | Tan et al. |
| 2010/0302707 A1 | 12/2010 | Tan et al. |
| 2012/0081833 A1 | 4/2012 | Cao et al. |
| 2012/0127122 A1 | 5/2012 | Lim |
| 2012/0241085 A1 | 9/2012 | Carver |
| 2013/0194716 A1 | 8/2013 | Holme et al. |
| 2013/0224397 A1 | 8/2013 | Carver |
| 2013/0229157 A1 | 9/2013 | Carver |
| 2014/0295101 A1 | 10/2014 | Carver |
| 2015/0000090 A1 | 1/2015 | Carver et al. |
| 2015/0000833 A1 | 1/2015 | Carver et al. |
| 2015/0017342 A1 | 1/2015 | Carver et al. |
| 2015/0131198 A1 | 5/2015 | Carver et al. |
| 2015/0131205 A1 | 5/2015 | Amaratunga et al. |
| 2015/0206658 A1 | 7/2015 | Carver |
| 2015/0206659 A1 | 7/2015 | Carver |
| 2015/0235768 A1 | 8/2015 | Holme et al. |
| 2015/0235769 A1 | 8/2015 | Carver |

FOREIGN PATENT DOCUMENTS

| | | |
|---|---|---|
| EP | 2 264 727 | 12/2010 |
| GB | 811295 | 4/1959 |
| JP | 54145000 A | 11/1979 |

(56) References Cited

FOREIGN PATENT DOCUMENTS

| JP | 2003-011270 | | 1/2003 |
|---|---|---|---|
| JP | 2007-106875 | A | 4/2007 |
| JP | 2010177571 | | 8/2010 |
| JP | 20120800099 | | 4/2012 |
| WO | WO2005/083726 | A1 | 9/2005 |
| WO | WO2009/046341 | A1 | 4/2009 |
| WO | WO2014/035456 | A2 | 3/2014 |
| WO | WO2014/074122 | A2 | 5/2014 |
| WO | WO2014/161007 | A2 | 10/2014 |

OTHER PUBLICATIONS

Japanese Office Action issued by JPO for JP 2015-540650 (dated Sep. 6, 2016).
PCT International Search Report for PCT/US2008/078808, 4 pages (dated Feb. 25, 2009).
Written Opinion for Singaporean Application No. 11201507993R (dated Jun. 20, 2016).
International Search Report for PCT/US2014/033102 (dated Oct. 8, 2014).
Definition for dielectric materials: http://whatis.techtarget.com/definition/dielectric-material (downloaded Jul. 28, 2014).
Final Office Action from the U.S. Patent and Trademark Office for U.S. Appl. No. 12/245,665 (dated Aug. 15, 2012).
Final Office Action from the U.S. Patent and Trademark Office for U.S. Appl. No. 14/490,873 (dated Jun. 4, 2015).
Ihn et al., "Dielectric Functions of Cd(1-x)Mg(x)Te Alloy Films by Using Spectroscopic Ellipsometry," *Journal of Korean Physical Society*, 43(4): 634-637, Oct. 2003.
Ihn et al., Parametric modeling of the dielectric functions of Cd1-xMgxTe alloy films, *Thin Solid Films*, 455-456 (2004) 222-227, May 1, 2004.
International Preliminary Report on Patentability and Written Opinion for PCT/US2014/033102 (dated Oct. 8, 2015).
International Search Report and Written Opinion from International application No. PCT/US2008/078808, dated Feb. 25, 2009.
*Modern Cyclophane Chemistry*, Eds. Gleiter et al., John Wiley (2004).
Office Action (with English-language translation) from the State Intellectual Property Office of the People's Republic of China for Appl. No. CN 200880119265.6, dated Jul. 20, 2011 (9 pages).
Office Action (with English-language translation) from the State Intellectual Property Office of the People's Republic of China for Application. No. CN 200880119265.6, dated May 11, 2012 (18 pages).
Office action (with English-language translation) from the Japanese Patent Office for Application. No. 2010-528177, dated Nov. 19, 2012 (9 pages).
Office Action from the U.S. Patent and Trademark Office for U.S. Appl. No. 12/245,665 (dated Dec. 7, 2011).
Office Action from the U.S. Patent and Trademark Office for U.S. Appl. No. 13/853,712 (dated Sep. 17, 2014).
Office Action from the U.S. Patent and Trademark Office for U.S. Appl. No. 14/156,457 (dated Aug. 1, 2014).
Office Action from the U.S. Patent and Trademark Office for U.S. Appl. No. 14/490,873 (dated Jan. 15, 2015).
Notification of the Decision of Rejection (with English-language translation) from the State Intellectual Property Office of the People's Republic of China for Application. No. CN 200880119265.6, issued Feb. 5, 2013 (20 pages).
Notification of Reexamination (with English-language translation) from the State Intellectual Property Office of the People's Republic of China for Application. No. CN 200880119265.6, dated Nov. 15, 2014 (19 pages).
Restriction Requirement from the U.S. Patent and Trademark Office for U.S. Appl. No. 12/245,665 (dated Sep. 13, 2011).
Written Opinion for Singaporean Application No. 11201507993R (dated Feb. 28, 2017).
Extended European Search Report issued for European Application No. 14774940.2 (dated Feb. 24, 2017).
Wang et al., "On the energy conversion and efficiency of a dielectric electroactive polymer generator," *Applied Physics Letters*, 101(3):33904-33904 (Jul. 2012).

* cited by examiner

STATE A

STATE B

STATE C

STATE D

US 9,786,442 B2

ENERGY STORAGE DEVICE

CROSS REFERENCE TO RELATED APPLICATIONS

This is the U.S. National Stage of International Application No. PCT/US2014/033102, filed Apr. 4, 2014, which was published in English under PCT Article 21(2), which claims the benefit of U.S. Provisional Application No. 61/808,733, filed Apr. 5, 2013 and is a continuation of U.S. patent application Ser. No. 14/156,457, filed Jan. 16, 2014, now U.S. Pat. No. 8,940,850, which claims the benefit of U.S. Provisional Application No. 61/808,733, filed Apr. 5, 2013, and which is a continuation-in-part of U.S. patent application Ser. No. 13/599,996, filed Aug. 30, 2012, now U.S. Pat. No. 8,633,289, which claims the benefit of U.S. Provisional Application No. 61/529,436, filed Aug. 31, 2011, and is a continuation-in-part of U.S. patent application Ser. No. 13/853,712, filed Mar. 29, 2013, now U.S. Pat. No. 9,011,627, which is a which is a continuation-in-part of U.S. patent application Ser. No. 13/671,546, filed Nov. 7, 2012, now abandoned, and is a continuation-in-part of U.S. patent application Ser. No. 13/599,996, filed Aug. 30, 2012, now U.S. Pat. No. 8,633,289, which claims the benefit of U.S. Provisional Application No. 61/529,436, filed Aug. 31, 2011, and is a continuation-in-part of U.S. patent application Ser. No. 12/245,665, filed Oct. 3, 2008, now U.S. Pat. No. 8,432,663, which claims the benefit of U.S. Provisional Application No. 60/978,067, filed Oct. 5, 2007, all of which are incorporated herein by reference.

FIELD OF THE INVENTION

This invention relates generally to an energy storage device, and, more particularly, to an electro-active electrical component used to store energy electrostatically in an electric field.

BACKGROUND

There has been a recent trend in the use of electrochemical capacitors for enhanced storage of electrical energy. These capacitors derive their enhanced characteristics from two primary mechanisms: double layer capacitance and pseudo-capacitance. Double layer-type capacitors use an electrical double layer (explained below) to achieve a very small charge separation (d), which increases electric field (E) for a given voltage, increases capacitance (C) and consequently increases the energy stored (U) for the given voltage versus a conventional planar surface capacitor, as apparent in Eqs. 1 through 3 below.

$$E = \frac{V}{d} \qquad \text{Eq. 1}$$

where E=electric field, V=potential difference or voltage, and d=separation of charged plates.

$$C = \frac{k\varepsilon_0 A}{d} \qquad \text{Eq. 2}$$

where k=relative permittivity or dielectric, C=capacitance, $\varepsilon_0$=permittivity of free space, and A=cross-sectional surface area.

$$U = \frac{1}{2}CV^2 \qquad \text{Eq. 3}$$

where U=energy stored, C=capacitance and V=voltage.

Practically, the smaller thickness (d) allows for much more surface area of the plates to be packaged (usually rolled or stacked) in a given volume. As evident from Eq. 2, this area increase also significantly increases capacitance. Devices of the above described nature are commonly referred to as electric double layer capacitors (EDLCs).

In pseudocapacitors, which are a hybrid between double-layer capacitors and batteries, both the bulk and the surface of the material play key roles. They thus can store much more energy than conventional planar surface capacitors, but face many of the same reliability and scientific challenges as advanced batteries, including high cost due to expensive raw materials and complex processing. Pseudo-capacitance imitates battery technology by storing energy in chemical reactions (oxidation and reduction) which take place at or very near the surface of the relevant electrodes. The surface nature of the reactions is the distinguishing characteristic from chemical battery technology.

Either or both of these effects (i.e., double layer and pseudocapacitance) may be used in so called "supercapacitors." Advantageously, the invention herein makes use of and extends double layer theories in a novel manner, without any formal "chemical reactions" present.

Also previously explored is the notion of enhancing a double layer capacitor by the application of an electrically conducting polymer e.g. Hu, U.S. Pat. No. 8,164,881. While the invention described herein certainly makes use of a polymer coating, the polymer is sometimes electrically resistive and sometimes insulating but is not electrically conducting by design. This significantly differs in structure, nature and consequently in function from previous applications.

Current EDLCs can handle only low voltages before breakdown. In order to attain the higher voltages necessary for many practical applications (such as electric vehicles), low voltage EDLCs are connected in series much in the same way batteries are series-connected for high voltage use. An energy storage device constructed according to principles of the invention can handle higher voltages and be connected in series.

The invention is directed towards overcoming one or more of the fundamental problems with existing designs and solving one or more of the needs as set forth above.

SUMMARY OF THE INVENTION

To solve one or more of the problems set forth above, in an exemplary implementation of the invention, an energy storage device comprises a capacitor having a first conductive electrode having a first outer side and an opposite first inner side; a thin non-porous first nonconductive coating on the first inner side of the first conductive electrode; a dielectric material on the first nonconductive coating, the first nonconductive coating being disposed between the first conductive electrode and the dielectric material; and a second conductive electrode adjacent to the dielectric material, the dielectric material being disposed between the second conductive electrode and the first nonconductive coating. Optionally, a second nonconductive coating may be provided on the second conductive electrode, disposed between the second conductive electrode and the dielectric material. The nonconductive coatings are thin, having a thickness that is less than 10% of the overall thickness of the energy storage device. Illustratively, and without limitation, the nonconductive coatings may be comprised of a condensed and polymerized xylylene monomer, a parylene polymer, Puralene™ polymer, a metal oxide, or some other insulator that can be deposited or otherwise formed in a thin film on the electrode(s).

The nonconductive coatings constitute insulating layers that allow for much higher voltages to be employed than in traditional EDLCs. This extends the layers from just a few (two or three which alternate in charge) to many (possibly orders of magnitude more in number) which can reach far into the dielectric medium. The increase in working voltage, significantly increases the electric field present in the capacitor and energy stored in the capacitor.

In one embodiment, the dielectric material is a variable viscosity dielectric material. In other words, the viscosity may be increased or decreased in a controlled manner, such as in response to an applied external stimulus. By way of example, the external stimulus may be a force, a pressure, a shear stress, a normal stress, heat, a heat sink, a coolant, a magnetic field, or an electric field. The external stimulus may comprise a mechanism from the group consisting of a controllable heat source, a heat sink, a coolant, a controllable cooling source, a controllable magnetic field generator, a controllable electric field generator, a controllable force generator, a controllable pressure generator, or a controllable shear stress generator. Viscosity of the dielectric can be made to gradually increase from electrode layer to electrode layer sequentially, or vice versa. With a viscosity increase, the discharge of the Helmholtz and Diffuse Helmholtz layers as thermal energy can be slowed and essentially halted with complete solidification. Electrical energy can thereby be stored for extended periods of time until ready for release. When ready for release, the viscosity may be reduced in a controlled manner such as by removing a viscosity-increasing stimulus or by applying a viscosity-decreasing stimulus. The reduction of viscosity facilitates discharge.

The dielectric material may be comprised of a dielectric substance such as a conductive polymer, a nonconductive polymer, an inorganic metal oxide, a metal oxide mixture, a biopolymers or some other dielectric substance with a changeable viscosity. Electro-rheological dielectric substances, magneto-rheological dielectric substances and Bingham plastic dielectric substances may be used within the spirit and scope of the invention.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, sequence of steps, configurations, shapes, relative sizes, ornamental aspects or proportions as shown in the figures.

DETAILED DESCRIPTION

In an exemplary embodiment of an energy storage device according to principles of the invention, an insulating layer directly allows for much higher voltages to be employed than in traditional EDLCs. This in turn increases the number of layers from just a few (two or three which alternate in charge) to many (possibly orders of magnitude more in number) which can reach far into the dielectric medium. A treatment as series capacitors (a common way to analyze multilayer capacitance) demonstrates that, for a set amount of charge, adding more layers will actually decrease capacitance and increase voltage. This increase in working voltage (both directly and indirectly from the use of an insulating layer) along with the small degree of charge separation previously observed in EDLCs, significantly increases the electric field present in the capacitor as can be seen from Eq. 1 (above). Worth further notice is the resulting dramatic increase in energy stored in the capacitor from the voltage increase as seen in Eq. 3 (above). While parameters can be manipulated to retain high capacitance (such as using stacks, rolls, and other "tricks"), the increase in voltage clearly outweighs the proportional decrease of capacitance in the contributions to the amount of stored energy of the overall device.

Figure 1:
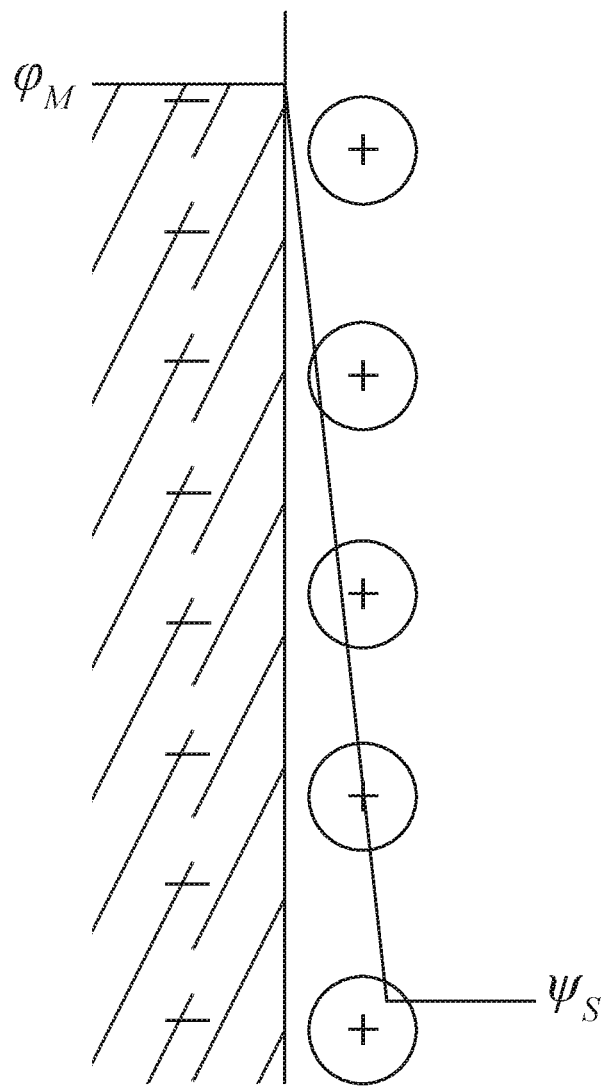
FIG. 1 is a schematic diagram that conceptually illustrates the Helmholtz model of an electric double layer.

As background, the first mathematical description of an electrical double layer is thought to have been written by Hermann Helmholtz. He depicted two parallel layers of dissimilar charge along a surface. This model gave a constant capacitance based on the separation of the layers and the dielectric properties of the medium. Helmholtz proposed that the interface between a metallic electrode and an electrolyte solution behaves like a capacitor in that it is capable of storing an electric charge. The Helmholtz model is conceptually illustrated in FIG. 1. Helmholtz's proposed model is that the electrode possesses a charge density arising from an excess negative or deficiency of positive charges at the electrode surface. In the model, the charge on the electrode is exactly balanced in solution by an equal but oppositely charged amount of ions. This charge originates from the arrangement of electrolyte ions at the interface and/or the reorientation of dipoles in solvent molecules. A potential difference occurs across the interface, forming an electric field gradient across a charge separation layer. Ions are electrostatically repelled or attracted towards the electrode surface and an excess of either anions or cations is created.

Figure 2:
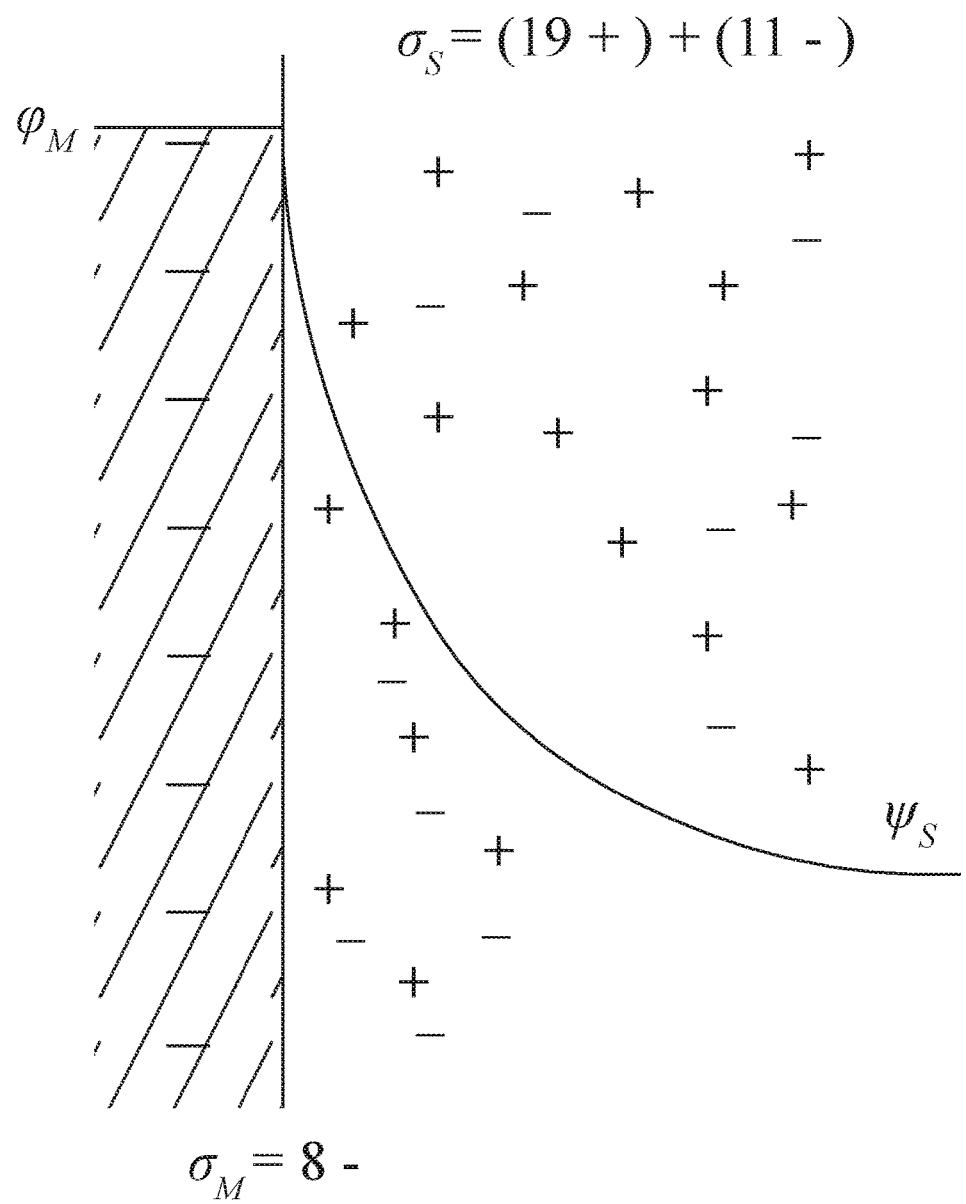
FIG. 2 is a schematic diagram that conceptually illustrates the Gouy-Chapman model of an electric double layer.

Upon observation that the capacitance was not truly constant with increasing potential (voltage), the Gouy-Chapman model was introduced. Gouy employed statistical mechanics to develop his theory and suggested that the thermal motion of the medium prevents the formation of an organized layer. The Gouy-Chapman model (FIG. 2) employs diffuse layers of charges which are quite unstationary. Gouy and Chapman proposed the diffuse double layer model that predicted a dependence of the measured capacitance on both potential and electrolyte concentration. They showed that the excess charge density in solution is not exclusively situated at the outer Helmholtz plane, and thus the double layer may be of variable thickness. In their view, a Helmholtz-type rigid double layer would not form because the attractive and repulsive electrostatic forces between the field and the charge on the ions are counteracted by random thermal motion in the dielectric solution which tends to disperse the excess ions from the surface of the electrode. In the Gouy Chapman model, the ions are considered as point charges contained within a single diffuse layer. This model, like the Helmholtz model, fails under particular conditions.

Figure 3:
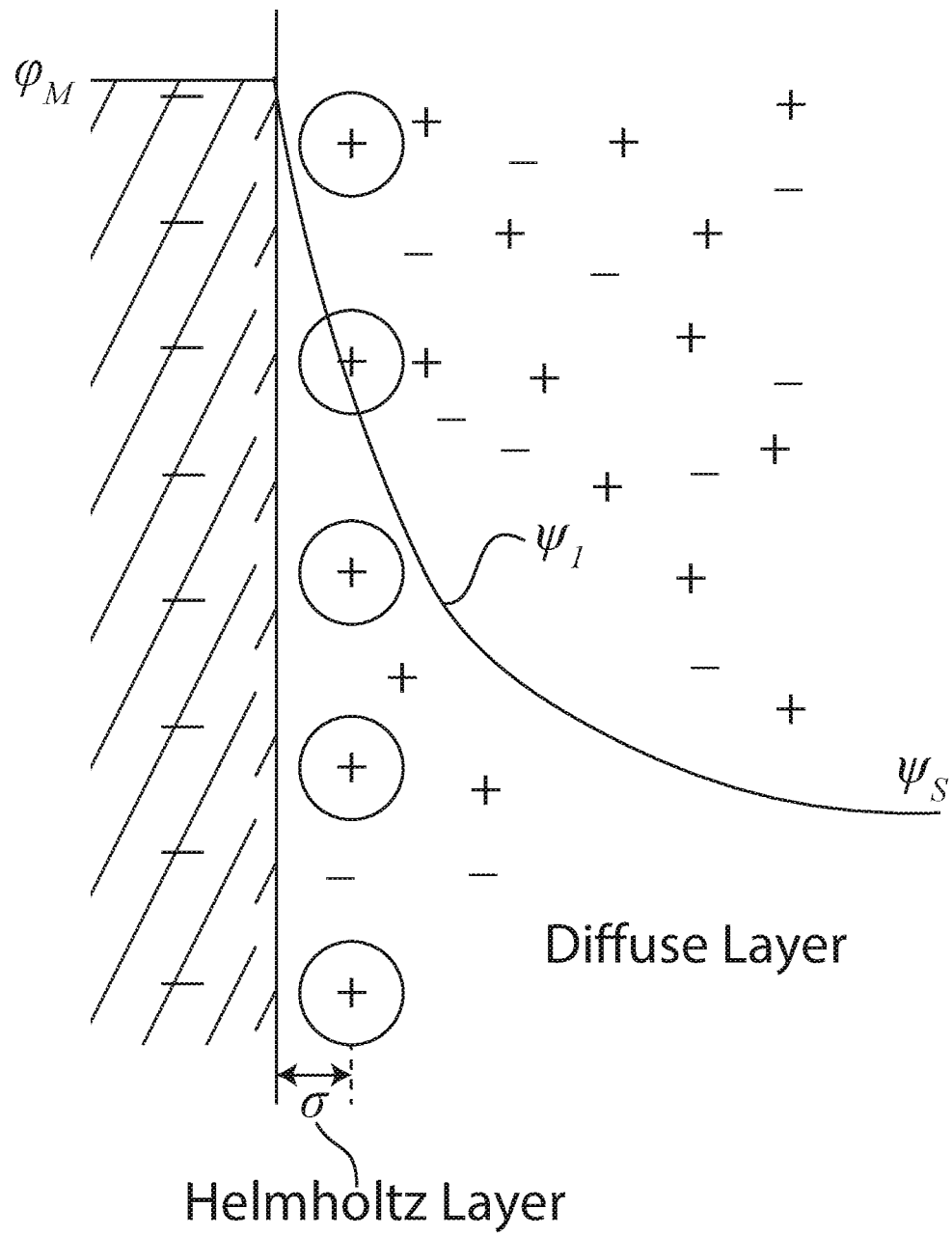
FIG. 3 is a schematic diagram that conceptually illustrates the Stern model of an electric double layer.
Figure 4:
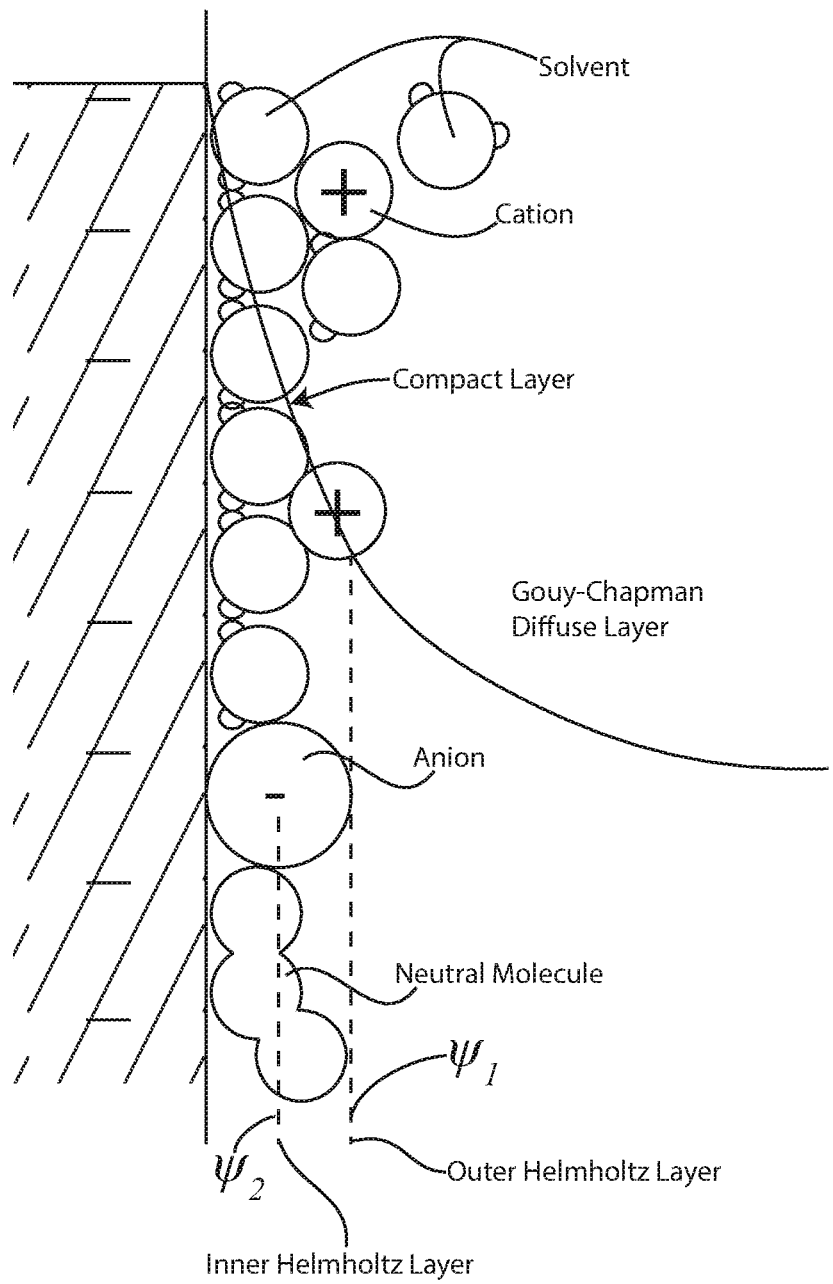
FIG. 4 is a schematic diagram that conceptually illustrates the Grahame model of an electric double layer.

Failures of the Helmholtz and Gouy-Chapman models prompted the contributions of Stern and then Grahame. Their work combined the two previously mentioned theories into one in which an inner "Stern layer" or "Helmholtz layer" is organized on a charged surface with a diffuse layer forming around it. In the Stern model, as conceptually illustrated in FIG. 3, the two previous models were combined, with some of the ions adhering to the electrode as suggested by Helmholtz and some forming a Gouy-Chapman type diffuse layer. Grahame proposed that, although the closest approach to the electrode is occupied by solvent molecules, it may also be possible for some ionic or uncharged species to penetrate into this region. This model for the electrode/electrolyte interface (FIG. 4) employs three regions. First, the inner Helmholtz plane or layer extends from the electrode to a plane passing through the centers of specifically adsorbed ions. Second, the outer Helmholtz plane or layer passes through the centers of hydrated ions at their distance of closest approach to the electrode. Third, the diffuse layer lies beyond the other layers. Potential $\psi$ changes linearly with distance up to the outer Helmholtz plane and then exponentially through the diffuse double layer region.

Figure 5:
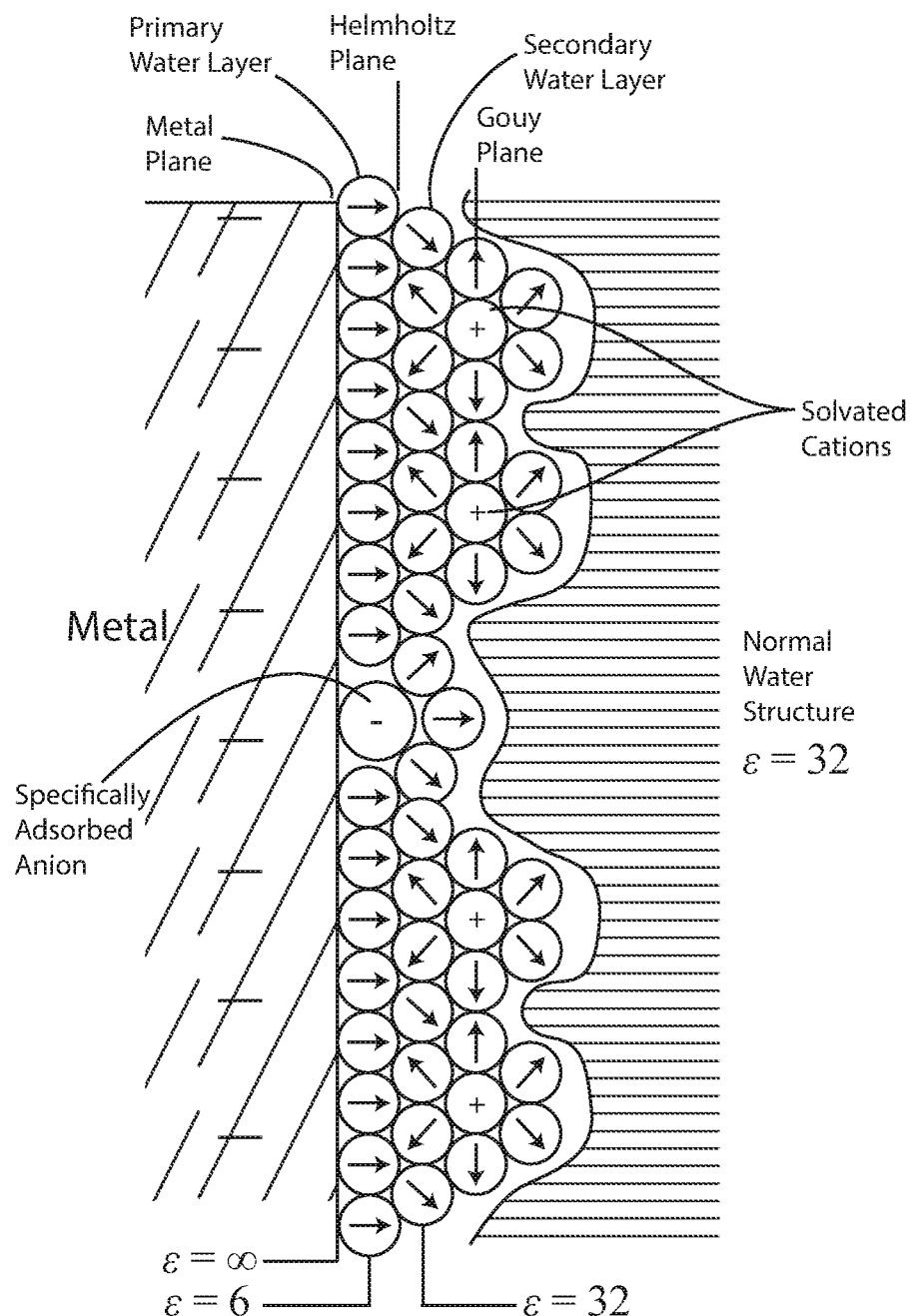
FIG. 5 is a schematic diagram that conceptually illustrates the model of an electric double layer by Bockris, Devanathan and Muller.

Still more work has been done to improve upon the theory by Bockris, Devanathan, and Muller who take into account solvent interactions in the dielectric. This model (illustrated in FIG. 5) is yet imperfect and operates on assumptions such as the approximation of ions as point charges, the constancy of dielectric permittivity, the constancy of viscosity, and the assumption that the significant interactions are all Coulombic in nature. Bockris, Devanathan and Muller suggested that reorientation of solvent molecules would occur depending on the excess charges at the electrode and the presence or absence of specifically adsorbed ions at the surface. The proposed variation of the electrostatic potential with distance is qualitatively similar to that of the Grahame model. Water molecules cover most of the electrode in an oriented layer. At certain sites, the water molecules are replaced by a specifically adsorbed ion (e.g., an anion) that has shed its hydration shell. The plane going through the center of these ions is the inner Helmholtz plane, defining the inner Helmholtz layer. Ions that carry a primary hydration shell are found next to and are situated outside of the first layer of water molecules adsorbed onto the electrode surface. The plane going through the centers of these ions constitutes the outer Helmholtz plane, defining the outer Helmholtz layer. None of these models teach or suggest an energy storage device with an insulating layer or a variable viscosity dielectric according to principles of the invention.

In the prior art it has been assumed that the energy stored in variously named layers adjacent to the electrodes is non-recoverable. In other words, when an electric potential is applied to a flat electrode in contact with a solution that has ions capable of movement through the solution, a movement of ions to that surface takes place. Once near enough to the electrode, the ions are assumed to be immobilized at the surface due to the strong electrostatic forces that bind them in place. The energy of collisions with solvent molecules is not sufficient to displace these ions. If the electric potential is removed from the surface, these ions are free to move about in a diffusive manner. It is interesting to note that if the electric potential is removed from the electrode surface, the resulting collapse of the electrical bilayer closest to the electrode allows the release of energy of the immobilized ions such that the energy is not fully released as heat, but instead the electrode can absorb the energy produced by the collapsing electrical field and produce an electric potential and current in that conductor. This effect is the basis for the energy storage in an electrical double layer capacitor (EDLC).

The energy that is stored in the diffuse outer layers of an EDLC is often not fully recovered. The electrical double layers that are formed close to the electrode surface are termed Helmholtz layers, while those that are further away are termed the Gouy-Chapman layers. One distinction between these layers is that the ionic layers that are not capable of being thermally diffused from the electrical surface are termed "Helmholtz" layers. These layers are essentially immobilized at the working temperature by the application of an electric potential to the surface. Another distinction is that the diffuse Helmholtz layers (Gouy-Chapman, but often referred to as Diffuse Helmholtz layers), referred to as DH layers herein, are layers wherein random thermal movements are able to diffuse the ionic arrangements induced by the electric field. Since this is not a sharp boundary, an arbitrary time unit associated with a 50% loss of potential energy over a period of 1 second could be used to define the boundary layer conditions between the two major macroscopic layers.

Both the Helmholtz and DH layers (which form at constant ambient temperature) are entropically reduced as compared to the bulk. These entropically modified materials display different physical characteristics that have been noted (e.g. permittivity). Application of the modified characteristics has been shown in U.S. Pat. No. 8,633,289, to be issued Jan. 21, 2014, which describes improved synthesis of the stable intermediate dimer of xylylene ([2,2']paracyclophane) and derivatives related to that compound and general structure, a method for the formation of cyclophanes and related compounds with various substituents, and a method to apply the xylylene (or substituted xylylene) monomers to make coatings and other polymer products derived from the reactive intermediate. Likewise, U.S. patent application Ser. No. 13/853,712, published as U.S. Publication No. 2013-0224397 on Aug. 29, 2013, describes, inter alia, a method for making high permittivity dielectric material for capacitors using organic polymers to produce low conductivity dielectric coatings.

The rationale for enhanced permittivity in entropically reduced materials is understood by the concept of the charges being "organized" into discrete rows and columns. Since each charge layer is energetically optimized to be in the lowest energy configuration possible based upon surrounding ionic charges, the imposition of an external electric field from the electrode leads to disruption of the lowest energy state attainable from its current position. Thus, when the electric field is applied, the dipole or ion is moved from its rest position, which in turn leads to a rearrangement of the charge distribution in the material. This leads to other rearrangements of all other dipoles continuing throughout the dielectric. Thus, energy that is not converted into heat is absorbed by the dielectric. When the energy is released, a reverse of this process can take place provided the energy stored is not released through other mechanisms such as increased thermal motions.

In the case of entropically "normal" materials, the rearrangement of the dipoles and ions in an electric field is not as certain to cause a rearrangement of all the other ions and dipoles in the materials. In other words, there is a probability that the rearrangement of the dipole or the ion can take place with little or no net interaction with the other dipoles and ions in the material. In these cases, the material will display less energy storage capability than in its entropically reduced form.

If the viscosity of the material is such that movement of the molecules is able to take place, the energy stored from the formation of the electric field by a given dipole or ion is able to dissipate through relaxation mechanisms in which the energy is converted into rotation, vibration, translation, and other movements that manifest themselves externally as heat. With a low viscosity material, the energy that has been stored in the Diffuse Helmholtz layers (DH layers) is thus lost due to random motions of the ions and dipoles.

With intermediate to high viscosity materials, the time frame for formation of the Helmholtz layers (H layers) and the DH layers is substantially increased. The thermal motions of molecules (excluding for now vibrations of the lattice as a macroscopic phenomenon), however, are effectively reduced to near negligibility. In these materials, it is possible to store the energy of an electric field in the H and DH layers relatively quickly compared to the time required for the energy to be dissipated thermally. Thermal dissipation is essentially a first order decaying exponential in time similar to radioactive decay or diffusion; if during the charging cycle the energy is absorbed over a time period of, for example, 1 second, a high viscosity material may require many seconds or even minutes to reach even 90% energy dissipation as heat.

The thermal decay process is substantially slower than the electrical double layer energy storage process. Thus, it is possible to utilize the energy stored by the formation of both the H and DH layers if the energy is quickly accessed. In this situation the release of most of the energy in the formed dipole and ionic layers is through the electric field and is subsequently coupled with electric potential and current. Since the discharge of the H and DH layers may require the movement of molecules and atoms, the discharge process can be relatively slow compared to charging but still remain fast relative to the relaxation mechanisms that produce heat.

Figure 6:
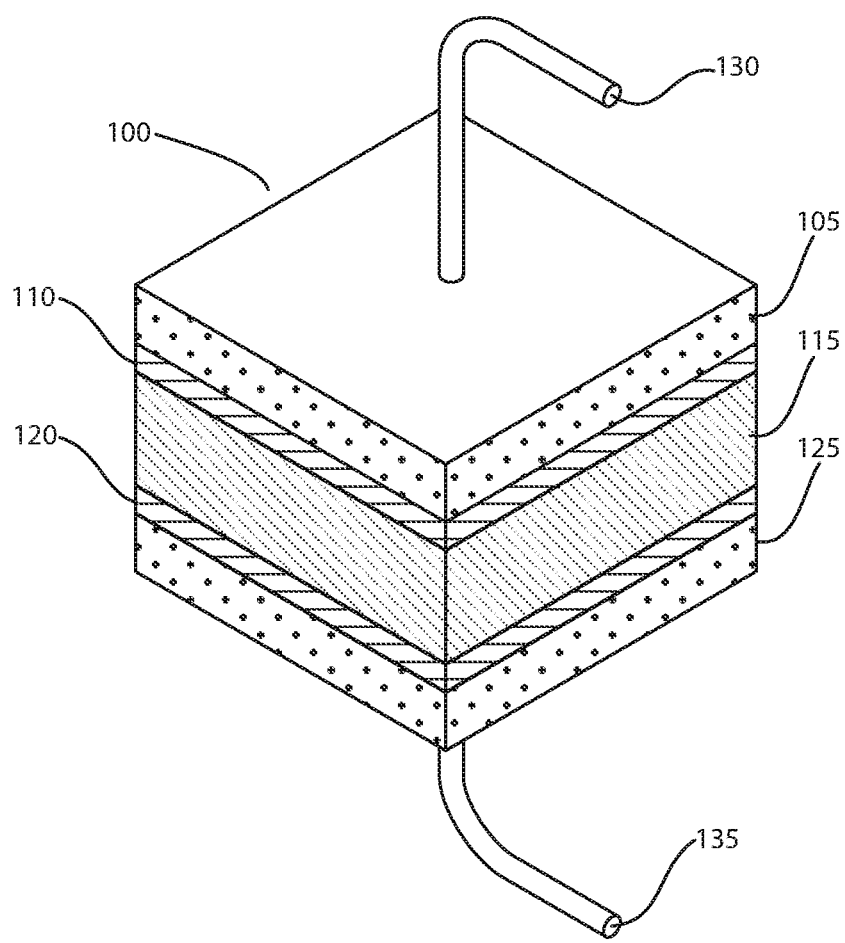
FIG. 6 conceptually illustrates an exemplary energy storage device according to principles of the invention.

As conceptually illustrated in FIG. 6, in an exemplary embodiment, an energy storage device according to principles of the invention includes a conductive electrode 105 having a smooth or rough surface, which, by example, may be comprised of a smooth metal, a conductive polymer or a rough carbon electrode of high surface area. A resistive or insulative coating 110 is applied to one surface of the electrode 105. By way of example, the coating 110 may comprise a metal oxide, Puralene™, plasma or film coating. A method of producing a Puralene™ coating is describe below. Puralene™ is applicant's trademark for the coating substance described below. A dielectric material 115, i.e., a high permittivity material or a dipole containing low viscosity material, is applied to the outer surface of the coating 110. By way of example, the dielectric material 115 may comprise a conductive or nonconductive polymer, an inorganic metal oxide, mixed metal oxides, mixed polymer and organic materials and biopolymers. Nonlimiting examples of other suitable dielectric compositions are described below. In a preferred embodiment, the low viscosity of the dielectric may be increased in a controlled manner by application or removal of energy in the form of heat, a force, electric field, magnetic field or other means of changing viscosity of the applied dielectric composition. The dielectric 115 may have its viscosity reduced to aid in the more rapid release of the energy from the bound dipole and ionic layers. An opposite conductive electrode 125 (which may be comprised of a conductor with insulative or resistive coating or without such a coating) is applied to the dielectric 115, i.e., the high permittivity material or dipole containing low viscosity material. The opposite electrode 125 may be the same material as the first electrode 105. An insulative or resistive coating 120 between the opposite conductive electrode 125 and the dielectric 115 is optional. This coating 120 may be the same as the coating 110 between the first electrode 105 and the dielectric 115.

The electrodes may be attached to a voltage source, via conductive leads 130, 135 (e.g., conductive wire leads, traces or other pathways), and allowed to charge. The viscosity of the dielectric 115 thus charged is optionally increased to allow for a longer period of electric charge storage due to the resulting decrease in random thermal motions or other viscosity-dependent processes. The dielectric is discharged by current flow out of the electrodes 105, 125 by an electrical load.

In a capacitor formed in this manner, equivalent charges of opposite sign will flow to each of the electrodes 105, 125. If the dielectric 115 (i.e., high permittivity material or a dipole containing low viscosity material applied to the surface of the resistive or insulative coating) of low viscosity is used, the charge flow will be very substantial for an extended period of time. Very viscous materials require much longer charging times at lower rate of charge flow. Once charge has been added from a voltage source, removal of the voltage source will then lead to a slow discharge of the voltage retained at the electrodes. The leakage current resistively discharges the energy stored in the formation of the H and DH layers.

Figure 14:
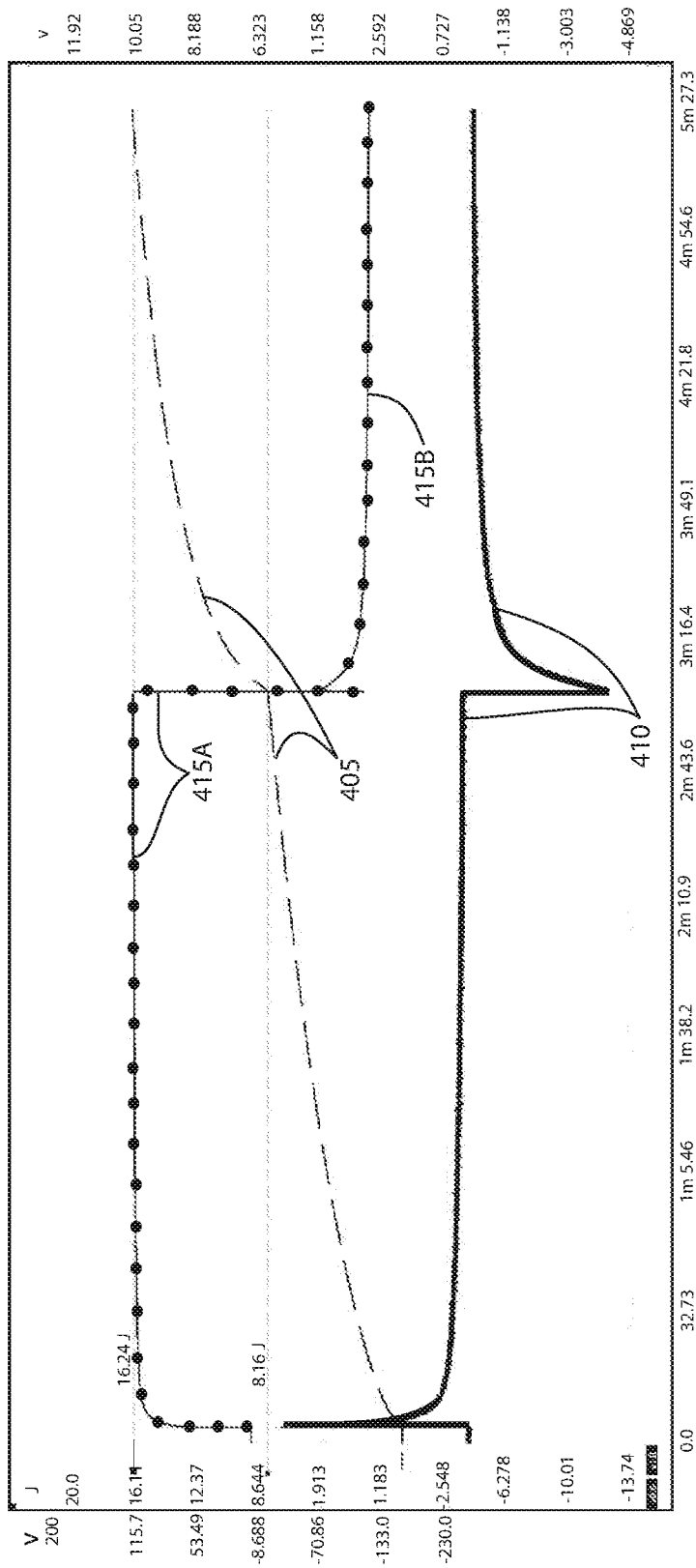
FIG. 14 illustrates voltages over time for an exemplary energy storage device according to principles of the invention.

The thicker the insulative coating 110, 120 the higher the external applied voltage needs to be in order to store a given amount of energy at constant thickness. Additionally, thicker insulative coatings 110, 120 such as PET (polyethylene terphthalate) produce an almost order of magnitude reduction in the energy storage capabilities. A Puralene™ coating is preferred due to its characteristics of reduced pinholes, i.e., being substantially nonporous, and its ability to be coated into very thin layers. This enables the overall thickness of a capacitor to be in the range of 100 microns and reasonable voltages are thus possible. For example if the thickness were 1000 microns and the insulative coatings 110, 120 were 1% of that thickness (5 microns each), then to attain a 10 V/micron e-field, 10,000V would have to be applied on the cap externally. This is too high of a voltage to be used economically and safely. Thus, the thinner the nonconductive coating 110, 120, the lower the voltage can be while retaining the storage capabilities of the device. Using Puralene™, which is inexpensive and exhibits very desirable qualities such as reduced pinholes, flatness, etc., and the high molecular weight ionic polymers salts described below for the dielectric 115, energy densities that are at least 10 times that of typical EDLCs are achievable. FIG. 14, which is discussed below, illustrates the differences in performance of an energy storage device according to principles of the invention, in contrast to that of a conventional EDLC and batteries.

Viscosity modifiers, such as solvents, branched polymers, low molecular weight oligomers, and dendritic polymers may be added to the dielectric material 115 to reduce viscosity. Ethanol and unreacted starting materials may serve such purposes.

Due to the viscosity dependence of the charging and discharging characteristics of the system, it is advantageous to include in the embodiment of this technology a method for dynamically varying the viscosity of the dielectric. There are a multitude of known methods for efficiently creating a controllable change in the viscosity of a fluid, many of which could easily be integrated into the system implementation by one well-versed in the art of materials sciences.

One non-limiting example of a method for controlling the viscosity of the dielectric is by controlling the temperature. If instead of maintaining the device described above at a constant temperature, during or after charging the device is cooled from an electrode 105 or 125 inward, then the viscosity of the dielectric can be made to gradually increase from electrode layer 105 to electrode layer 125 sequentially, or vice versa. Assuming a viscosity increase with lower temperature (although the opposite effect can sometimes be obtained) the discharge of the H and DH layers as thermal energy can be slowed and essentially halted with complete solidification. The electrical energy can thereby be stored for extended periods of time until ready for release.

Release of the electrical energy with minimal losses to heating is similar to the manner that it was charged. The cooled device can be warmed as necessary with ambient heat or generated heat to release electrical energy through the electrodes as the viscosity of the internal dielectric is reduced. This slow warming has the added benefit of preventing rapid discharge of the energy contained in the H and DH layers. Coordination of the warming of the electrodes and dielectric can be made to accommodate the energy demands of the electrical load. Care must be taken in the system design in order to prevent a runaway condition in which internal or external heating of the dielectric causes the temperature to rise rapidly and in turn decrease viscosity at an increasing, uncontrolled rate.

Figure 7:
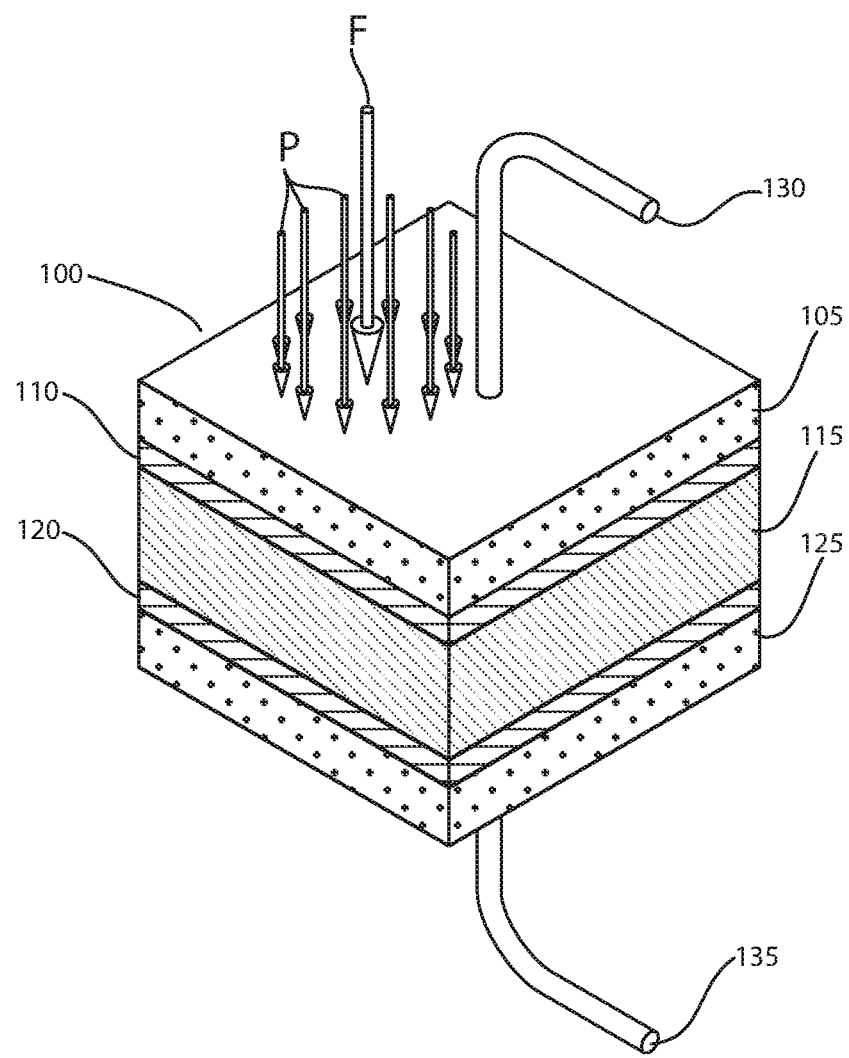
FIG. 7 conceptually illustrates an exemplary energy storage device with applied forces according to principles of the invention.

Another well-known method for viscosity control is via exploitation of non-Newtonian fluid effects. A multitude of materials exhibit, to varying degrees, a nonlinear or offset relationship between viscosity and applied stress, shear rate, time, or other factors. Applied forces and pressure are conceptually illustrated in FIG. 7. Common materials have been noted which exhibit either an increase or decrease in apparent viscosity when subjected to mechanical stress. These materials are often classed as shear thickening (dilitant) or thinning (pseudoplastic), depending on the sign of the viscosity change. Many materials in this class exhibit viscoelastic effects, in that they have a tendency to return to their original shape once stress is removed. Additionally, other materials exhibit time dependence on viscosity with stress (thixotropic and rheopectic fluids, again depending on sign), and still others exhibit an offset relationship between viscosity and stress. The latter, known as a Bingham plastic, is of particular interest in this application due to its specific characteristics.

A Bingham plastic is a viscoelastic material that behaves as a rigid body at low stresses but flows as a viscous fluid at high stress. More specifically, a Bingham plastic is known to act as a solid when applied stress is below a given limit, and therefore has a measurable yield stress or other factors. By manipulation of this feature, a dielectric which acts as a Bingham plastic could be held in a solid state under low-stress conditions, preserving H and DH layer formations for an extended period of time. When it becomes necessary to release the energy stored within said layers, a varying amount of stress would be applied to the dielectric, thereby controllably lowering it's viscosity.

The makeup of the dielectric could be chosen such that it exhibits a desirable set of non-Newtonian fluid characteristics. The embodiment of the device could then be engineered such that stress could be applied through mechanical or other means to appropriately control the viscosity of the dielectric. For a non-limiting example, the capacitor stack could be placed between two plates. The bottom plate would be fixed in place, while the top plate is attached to a mechanical, electromagnetic, hydraulic, or pneumatic actuator. When it becomes desirable to apply stress to the material, the actuator could apply force in a linear or rotational direction so as to apply the optimal amount, rate, and combination of shear and normal stresses deemed most suitable to the fluid application. Alternative methods include using a hydraulic or pneumatic bladder to apply stress on the capacitor stack between two fixed plates, as well as surrounding the device with a shape memory alloy, electroactive ceramic, dielectric elastomer, or other active element.

A combination of these effects may also be used to effect a change in the dielectric's viscosity. By combining a non-Newtonian shear thickening dielectric fluid with low stiffness and compliant electrodes, the capacitor forms what is known as an electroactive polymer or specifically a dielectric elastomer actuator. Once a charge is applied to this capacitor, the electrostatic force between the electrodes causes a force directed normal to both plates. This force effectively "squishes" the dielectric together, applying a normal stress to the dielectric. If this dielectric were also a non-Newtonian shear thickening fluid, the viscosity would increase as the applied shear stress increases.

The viscosity of the dielectric material could also be dynamically controlled by the modification of its physical characteristics to enhance the dielectric's viscoelectric properties. In a viscoelectric or electro-rheological fluid, the makeup and structure of the dielectric fluid causes enhanced reactivity to external electric fields. An applied electric field can cause extreme, rapid, and reversible changes in viscosity. Electrorheological fluids can behave as a Bingham plastic, described previously, such that the yield stress is proportional to the applied electric field. The design of the electrode has been shown to increase electro-rheological effects. Much in the same way, the dielectric may be designed to exhibit magneto-rheological effects, which will respond to a magnetic field rather than an electric one. The magneto-rheological effects may be even more applicable through lack of interference with the energy storage mechanism of the device.

In the case of both the dielectric elastomer actuator and viscoelectric embodiment, care must be taken to avoid a runaway condition. Because the viscosity of the fluid is determined by the field magnitude applied to it, specific conditions such as short circuit are especially dangerous. If a short circuit condition is allowed to exist, the charge on the electrodes would be rapidly removed and therefore the viscosity of the dielectric fluid would decrease rapidly. This decrease in viscosity would greatly increase the mobility of the H and DH layers, causing rapid discharge of stored energy into a potentially dangerous (i.e. short circuiting) load.

Figure 8:
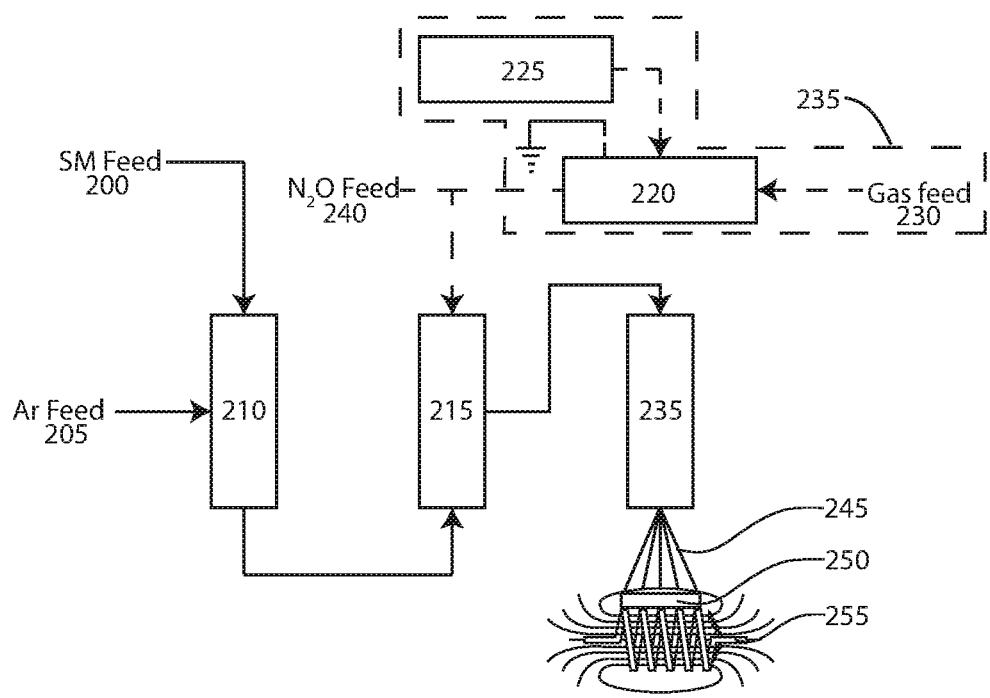
FIG. 8 conceptually illustrates a flow diagram for producing a polymer for use with an exemplary energy storage device according to principles of the invention.

In one exemplary capacitor according to principles of the invention one 105 or both electrodes 105, 125 (each of which may be a smooth copper electrode for example) may be coated using a Puralene™ coating process. Referring now to FIG. 8, a high level flowchart that illustrates an exemplary method of producing an augmented permittivity material, e.g., Puralene™, for use as a coating in a capacitor according to principles of the invention is shown. Sections, referred to as chambers, may comprise tanks having an inlet and an outlet or tubular structures with an inlet and an outlet. Chamber 210 is a heated tube or other evaporation device intended to volatilize starting material feed 200. Starting material feed 200 is evaporated and mixed with inert gas 205 in chamber 210. Inert gas 205 may be any of a group, or a mixture of, inert or essentially inert gases, such as, but not limited to, argon or nitrogen. Substitution of nitrogen for argon and/or other essentially inert gases is possible. Pumps and valves may be used to propel and control the flow of fluids from one station to another.

By way of example and not limitation, chamber 210 may comprise an electrically heated Inconel (nickel alloy 600) pyrolysis reaction tube. The tube is heated to a temperature of about 450° C. to 630° C. at atmospheric pressure. A flowing stream of argon gas alone, or with a reactive compound such as nitrous oxide, is supplied to the pyrolysis reaction tube. The starter material feed 200 may be xylene vapor (Aldrich #134449-4L). If the carrier gas 205 includes a reactive species or compound (e.g., N$_2$O), the ratio of gases is adjusted to provide approximately molar stoichiometric ratios of 1:1 of the reactive species or compounds (xylene to nitrous oxide).

The heated starter material 200 in the volatile mixture with inert gas reacts with monatomic oxygen in reaction chamber 215. Being very reactive and transient, monatomic oxygen must be available to react with the volatile mixture in the reaction chamber 215. As discussed above, the source of monatomic oxygen may be a gaseous compound supplied with the carrier gas 205, or a gaseous compound supplied separately 240, or another source, such as a plasma generator 235.

Monatomic oxygen plasma may be created by exposing oxygen (O$_2$) gas to an ionizing energy source, such as an RF discharge, which ionizes the gas. Alternatively, a compound such as Nitrous Oxide (N$_2$O) may supply monatomic oxygen for the reaction through thermal, catalyzed, and/or other decomposition. Thus, a monatomic oxygen plasma generator 235, or a monatomic oxygen chemical compound (e.g., N$_2$O) feed 240, or another suitable source of monatomic oxygen is provided.

A plasma gas can be used with the aforementioned starting materials to form the intermediate oxidized products that may subsequently react to form reaction products that are oxidized forms of the starting materials which may be monomers, dimers, trimers, oligomers, or polymers. The plasma generator 235 includes a gas feed 230 that supplies gas to a plasma reaction chamber 220. A plasma driver 225 provides energy to ionize the gas.

The ratio of gases is adjusted to provide approximately molar stoichiometric ratios of 1:1 (xylene to nitrous oxide or xylene to monatomic oxygen). Illustratively, increased amounts of nitrous oxide result in partial and/or complete oxidation of xylene with reduced formation of the desired cyclophane or its polymer. Close control of the stoichiometric ratios of the reactants is desired in this reaction.

The reaction products are supplied to a reaction chamber 235, which is heated to approximately 450° C. to 800° C. to facilitate vaporization of the reaction products. The vaporized reaction products 245 are expelled onto a lower temperature collection surface 250, where the reaction products condense and form a solid. At higher temperatures (650° C. to 800° C.) the output of the reaction chamber 235 is sufficiently hot enough to maintain the monomer p-xylylene in monomeric form.

Condensation of the gas into a cooled glass vessel resulted in the deposition of a colorless to cream colored solid. This solid is partially soluble in 95% ethanol. The solid was compared to a sample of [2,2']paracyclophane (Aldrich #P225-5G-A) by Gas Chromatography analysis (SRI#310, 15 m megabore column, FID detector) and was shown to give identical retention times.

Rapidly cooling of the monomer onto a surface 250 (which, such surface, may comprise a surface of an electrode 105, 125) results in a liquid condensation of the monomer and rapid polymerization of the monomer into a polymer. Comparison of the film thus produced appears to be identical to parylene film formed by the conventional vacuum pyrolysis of dimers produced by the Gorham process. Without augmentation of the Puralene™ polymer, permittivity of both solidified products is about 3, electric breakdown strengths are about identical at 100 V/micron, and solubility in both hot and cold solvents are below detectable levels.

In this reaction it is believed that the reactive p-xylylene reactive intermediate is formed and subsequently may be dimerized in the reaction tube 235 or during condensation 245 onto the substrate 250. This reaction used to synthesize the dimer, in comparison with the known "Gorham process", results in a vast improvement in the overall synthesis yield of the dimer and also results in a vast improvement in the purity of the dimer directly from the reaction. It is understood that variation in the stoichiometric amounts of the reactants may be adjusted to provide for greater or lesser yield with associated purities varying to provide a more economical process or better overall production efficiency without substantially deviating from the scope of this invention. Subsequent purifications of the materials from this reaction can be performed on this material in a manner that is much easier to accomplish than with previously taught processes. The reaction is shown below.

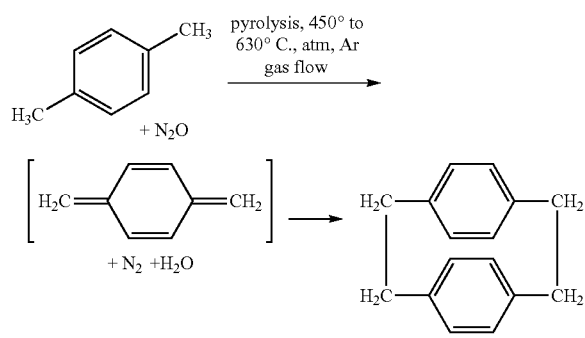

As the reaction temperature at station 235 is increased to >650° C., the deposition of the xylylene monomer can proceed directly onto a solid substrate target without necessity for isolating the intermediate dimer. Deposition of the exit gas at above 650° C. reaction temperature upon a cool glass plate resulted in formation of an ethanol insoluble substance that displays characteristics of a parylene polymer. However, observed solubility characteristics clearly show that the material is insoluble in all common solvents (i.e. hexane, xylene, ethyl acetate, ethanol, water).

It is believed that the reaction mechanism proceeds through a route involving the prior decomposition of nitrous oxide. Nitrous oxide is an energetically unstable molecule that can be thermally decomposed at elevated temperatures. Products of the reaction are diatomic nitrogen and monoatomic oxygen. The monoatomic oxygen is able to react with itself to form diatomic oxygen, but this reaction is relatively slow. Estimates vary determining the temperature that pure thermal decomposition occurs, but estimates of 1100° C. are often cited. Catalysis of this reaction as shown below in equation 1 is known to occur with a variety of metal oxides and mixed metal oxides. Some temperatures used for nitrous oxide decomposition with certain catalysts are as low as 350° C.

$$N{\equiv}N^+{-}O^- \longrightarrow N{\equiv}N + O^{(0)} \qquad \text{Eq. 4}$$

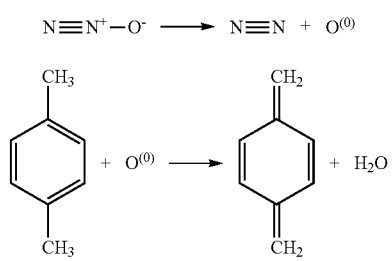

Eq. 5

The reactive species for the process is very likely the monoatomic oxygen produced from the decomposition of the nitrous oxide. In this sense, the nitrous oxide can be viewed as a convenient carrier for the delivery of the reactive intermediate, monoatomic oxygen.

In a similar manner to the nitrous oxide reaction, pure diatomic oxygen can be utilized as a reactant. However, to produce substantial yields of the desired products, activation of the oxygen is necessary. It is believed that activation of the oxygen is due to the excitation of the oxygen molecule to produce monoatomic oxygen as shown in Equation 3.

$$O{=}O \xrightarrow{\text{[plasma]}} O^{(0)} + O^{(0)} \qquad \text{Eq. 6}$$

The reaction with monoatomic oxygen produced in this manner thus proceeds in a manner similar to that of the nitrous oxide decomposition route.

Cooling of the elevated temperature gases 245 exiting from the reaction tube 235 is necessary. If the reaction gas is at too high of a temperature, the ability of the reactive intermediate to condense and adhere to a surface is greatly reduced. To this end, a device to mix cool nonreactive or inert gases into the hot reaction stream has been devised. The reaction may proceed at increased or decreased pressure (above or below atmospheric pressure). Accordingly, an expansion valve may be used at the exit of the reaction tube 235 to provide Joule-Thomson effect cooling of the hot gas when the gas is below its inversion temperature.

The method may be extended to other substituents such as the ones shown below.

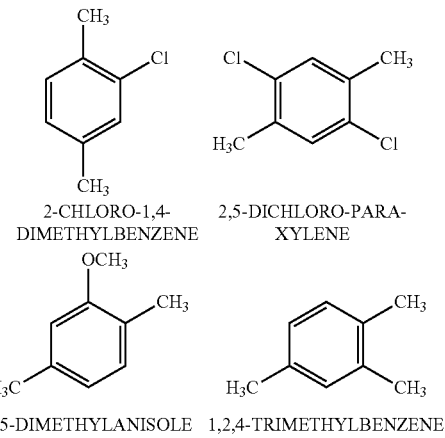

Substituents such as the ones noted above (chloro, dichloro, methoxy, and methyl) are not the only aromatic substituents that are capable of being modified by this process into reactive intermediates and their subsequent polymers. Additionally, paracyclophanes and compounds derived thereof are not exclusive to this process. Meta and ortho orientation of the substituents on the aromatic rings are also viable reaction starting materials. The reaction can be generalized to include all compounds that are capable of reaction with monoatomic oxygen produced from a plasma or from decomposed oxygen-containing substances or its intermediate reaction products and also contain hydrogen atoms stabilized by the presence of an aromatic ring. Typically such hydrogen atoms are located in a position alpha to a phenyl ring (benzylic position). Michael structures removed from the alpha aromatic ring positions are known to give similar reactivity to the hydrogen alpha to the aromatic ring position as is well known to those versed in organic synthesis. However, the reactivity of such hydrogen atoms is not limited to alpha and/or Michael positions from an aromatic ring or the aromatic ring such as benzene. Other aromatic stabilizations are known for many different rings, fused rings, and non-ring systems, as known to those versed in the art of organic chemistry. Such starting materials may preferably have the presence of two hydrogen atoms that are capable of being removed to form partially oxidized starting materials. These preferred materials may optionally have the ability to dimerize, trimerize, oligiomerize, or polymerize. The nonlimiting example used herein is p-xylene.

One implementation of the invention augments permittivity of the polymer by exposing the condensing reaction products 245 to a magnetic or electric field. To the output of the reactions described above, the gaseous stream of reaction product 245 is directed to a cool solid surface 250. Illustratively, the surface target 250 may be immersed in a magnetic field 255 such as that provided by a Neodymium magnet (S84, K&J Magnetics). Other magnetic field sources may be utilized and are intended to come within the scope of the invention. Condensation of the monomer and subsequent polymerization can proceed rapidly while in the magnetic field 255. If the target and the magnet maintain the same relative orientation during the polymerization process, then a baseline increase in the electrical permittivity has been shown to occur. If the orientation of the magnetic field 255 relationship to the target is rotated during the polymerization or solid phase condensation process, then the resulting permittivity has been shown to decrease.

When the reaction is conducted as noted above, using the p-xylylene monomer as the polymerization molecule, but without the presence of the applied magnetic field the relative permittivity of the material deposited is approximately 3. When the material is run as described with a magnetic flux 255 density of approximately 200 to 2000 Gauss, the relative permittivity is approximately 7. Thus, the magnetic field has been shown to substantially increase the permittivity of the product by over a factor of 2 times. In a similar manner other salts, dipoles, and salts of organic acids can be entropically oriented during solidification or polymerizations to produce enhanced high permittivity materials. Improvements in permittivity from 10 to over 1000% may be attained.

In another implementation, the surface target 250 is immersed in an electric field 255 such as that provided by a high voltage power supply (G40, Emco, 4000V). Condensation of the monomer and subsequent polymerization can proceed rapidly while in the electric field. If the target and the electric field maintain the same relative orientation during the polymerization process, then a baseline increase in the electrical permittivity has been shown to occur. If the orientation of the electric field relationship to the target is rotated during the polymerization or solid phase condensation process, then the resulting permittivity has been shown to be lower.

Condensation of dielectric reaction products in the presence of an electric and/or magnetic field, has been shown to augment the permittivity of the condensed dielectric. This step may be applied to compounds other than parylene polymers.

When the condensation step is conducted as noted above, using a mixture of maleic acid salt with guanidine as a high dielectric material, but without the presence of the electric field the relative permittivity of the material deposited is approximately 500. When the material is processed as described with an electric field density of 10,000 to 30,000 V/m, the relative permittivity is approximately 25000 to 40000. Thus, the electric field has been shown to substantially increase the permittivity of the dielectric field by at least a factor of 25 in that particular case. In a similar manner other salts, dipoles, and salts of organic acids can be entropically oriented during solidification or polymerizations to produce enhanced high permittivity materials. Improvements in permittivity have been shown to range from 5 to over 10000%.

The use of electrical and/or magnetic fields during the condensation process modifies the mechanical strength of the product. The material may not be anisotropic after condensation in strong fields. Thus, this method could be utilized as a way of controlling the mechanical properties of the reaction products made by this procedure.

The thickness of a Puralene™ coating 110, 120 may range from 5 to 30 nm to greater than 10 microns. The coated electrode 105, 125 is then used as the basis for application of the dielectric material 115.

Dielectrics that may be used to form a capacitor according to principles of the invention abound. However, to produce a substantially improved energy storage device, it requires more than simply making a dielectric and putting it between two electrodes. The method whereby the dielectric is selected, transformed, and applied is of critical importance and not obvious to those skilled in the art of capacitor manufacture.

In an exemplary implementation, a viscosity stratified dielectric for an energy storage device according to principles of the invention may be formed from 15 grams of protein powder (such as Zein, Sigma-Aldrich #Z3625), to which 50 ml of absolute ethanol is added. The solution is well stirred under inert atmosphere until complete dissolution is obtained. To this solution is added portion-wise 10 g of maleic anhydride (Sigma-Aldrich #M188) solid with vigorous stirring for a total period of 30 min. The solution is heated to 60° C. during this period of time. At the end of the period 0.5 g of dicumylperoxide (Sigma-Aldrich #329541) is added portion-wise over 5 min. The solution is allowed to boil and stir at above 60° C. for 1.5 h. The solution is cooled to room temperature. Then solid guanidine carbonate (Sigma-Aldrich# G1165-9) is added portion-wise until the solution is neutral to basic. A resulting honey colored liquid may be used in the dielectric. Alternatively, other materials such as copolymerized maleic acid/acrylic acid (Sigma-Aldrich #416053) may be neutralized with guanidine to produce similar results. Alternatives to guanidine may be used as well. For non-limiting example, Cesium carbonate and Rubidium carbonate may be used as substitutes. Other organic, polymer, and inorganic cationic species may be substituted. Ultrahigh molecular weight acrylic acid/acrylamides are also possible dielectrics when they are optionally neutralized to their salts forms.

Figure 9:
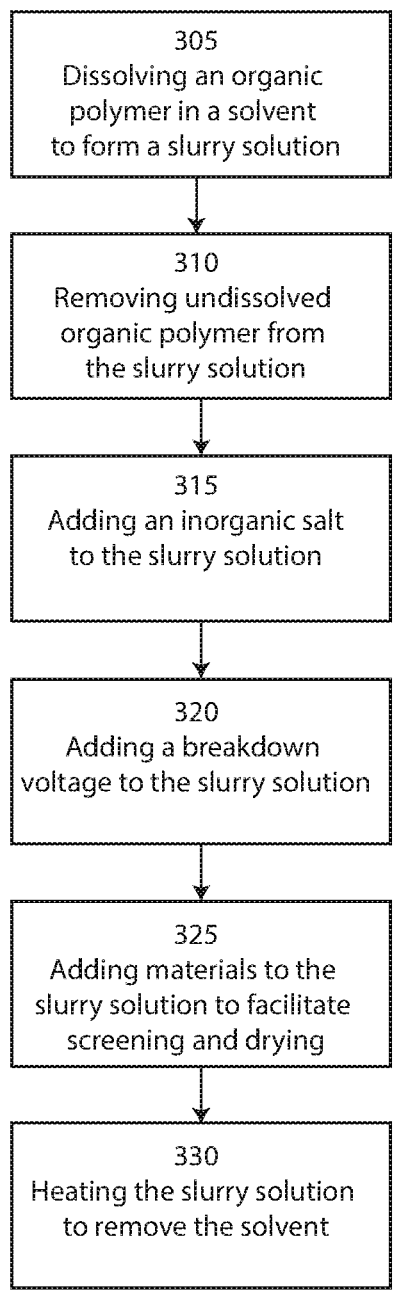
FIG. 9 is an exemplary flow chart illustrating a method for making a high permittivity dielectric material for use in an energy storage device according to principles of the invention.
Figure 10:
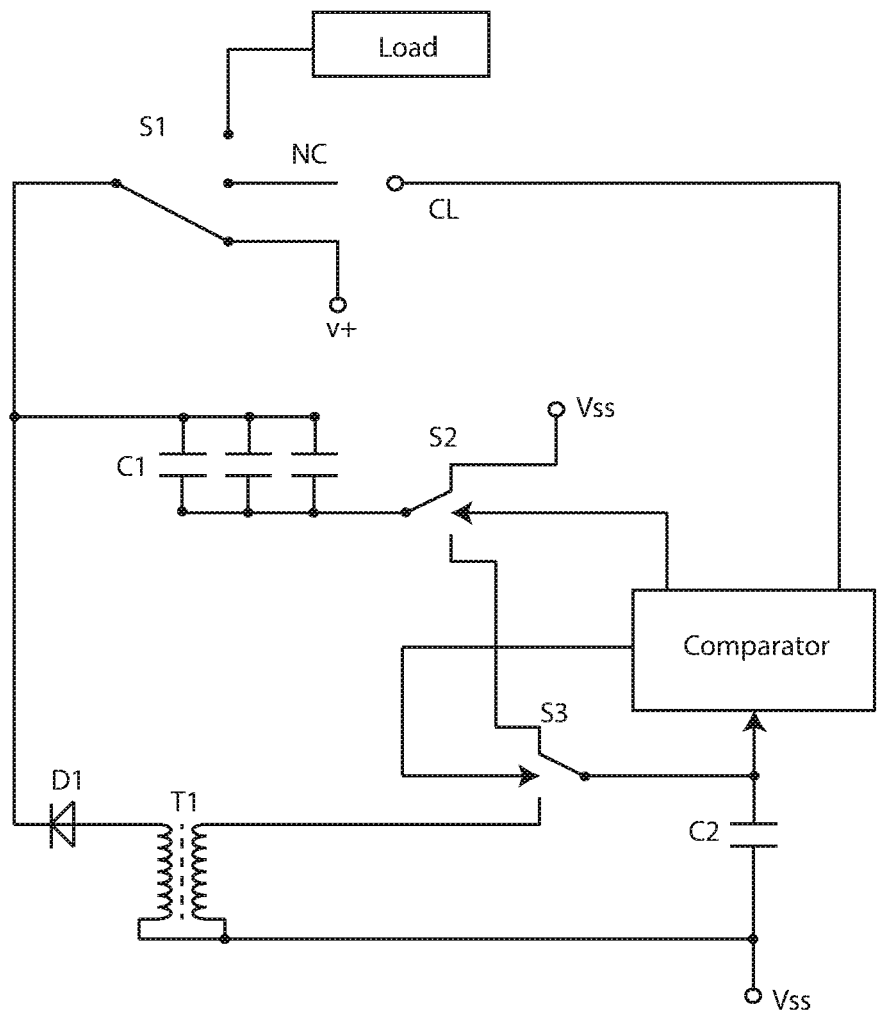
FIG. 10 conceptually illustrates a multi-state electrical circuit diagram in accordance with one or more embodiments of the present disclosure for the recovery of leakage current from an energy storage capacitor.

FIG. 9 is an exemplary flow chart illustrating a method for making a high permittivity dielectric material, according to an embodiment of the present disclosure. The method begins by dissolving an organic polymer in a solvent to form a slurry solution (305). The polymer may be shellac, silicone oil, zein, and/or another organic polymer. In one embodiment, the undissolved organic polymer is removed from the slurry solution (310), for non-limiting example, using a filter or centrifuge. An inorganic salt may then be added to the slurry solution (315). The inorganic salt may be a transition metal salt, such as a Gd, Sr, Sn, Fe salt, or a mixture thereof. In one embodiment, a breakdown voltage adjuvant may be added to the slurry solution (320). The breakdown voltage adjuvant may include one or more of Y, Ni, Sm, Sc, Tb, Yb, La, Te, Ti, Zr, Ge, Mg, Pb, Hf, Cu, Ta, Nb, Bi, or a mixture thereof. To facilitate screening and drying, a dimethyl formamide and a dimethylsulfoxide may be added to the slurry solution (325). The slurry solution may then be heated to a temperature of about 150° C. to about 300° C. to remove or evaporate the solvent (330). This method avoids high process temperatures and produces a high dielectric capacitor with a high breakdown voltage.

Other suitable dielectric materials include conductive polymers salts, such as salts of acrylic acid, acrylamides, methacrylates, polypyrrole, etc.; inorganic metal oxide such as perovskites (i.e. barium titanate, strontium barium titanate, etc.); charged ionic liquids such as polymer salts and other electrically charged liquids or semi-solids that may have ability to migrate or move to some extent within a matrix; or a mixture of these.

The applied dielectric material 115 has a second electrode 125 added that may be optionally coated with a nonconductive coating 120 such as Puralene™, using a coating process as described above. Connection of the electrodes 105, 125 to a voltage source and a load via leads 130, 135 is similar to that of a traditional electrostatic capacitor.

In another exemplary embodiment, a high surface area electrode 105, 125 is used instead of a smooth electrode. This provides for a greater surface capacitance and a faster discharge during the first phase of discharge. The high surface area electrode may comprise activated carbon or another conductive material which, when applied to the surface of the electrode, exhibits high surface area. The adjacent electrode may be coated or uncoated.

In another embodiment, an energy storage device according to principles of the invention may contain a dielectric material that has the property of changing viscosity. The methods for introduction of variable viscosity into the dielectric may comprise variable temperature, variable electric field, variable magnetic field, variable pressure, variable shear and/or normal stress. Variable pressure, shear and stress are each a type of application of force. The direction and distribution of the applied force determines whether it is a pressure, shear or stress.

An exemplary method of making a magnetorheological dielectric entails distributing electrically insulated (or non conducting) magnetic particles throughout the dielectric. Once the H and DH layers are formed, a magnetic field would be applied to increase the viscosity of as well as to prevent particle migration through the dielectric and "lock in" the H and DH layers. Altering the magnetic field strength would allow controlled dissociation of the layers through charge migration (current flow) within the dielectric itself. Also, the applied magnetic field could potentially introduce additional layering or entropic changes for energy storage.

An explanation of the mechanism whereby the energy is stored in these devices is proposed. Although useful for a working theoretical model, no explanations offered herein in any way detracts from the inventiveness of the method or the processes described.

In general the largest mechanism for the initial charging current into the energy storage devices noted above are through the capacitance-mode of the device. During the later energy storage phase of charging, the diffuse Helmholtz layer formations is the primary mode of energy storage. This DH mode is more easily accomplished when the dielectric material is less viscous. This general rule is tempered by the fact that certain polymers can display more viscous characteristics while under an electric field than not. However, the formation of the DH layers is more pronounced when the device is under a greater electric field. To prevent the dissipation of energy stored in the DH layers, it desirable to have the viscosity increase after the electrical energy has been used to form these layers. In this way dissipation of the energy is decreased and potentially mitigated.

If there is dissipation of the energy thus stored through the electrical field of the device, it may be advantageous to use an electronic circuit to recover at least a portion of the energy converted by "leakage" and subsequently saved by storage into an external energy storage device or consolidated and returned to the device itself.

Referring now to FIGS. 10-13, a multi-state electrical circuit diagram is illustrated in various states in accordance with one or more embodiments for making an electronic device for the recovery of leakage current from an energy storage capacitor. FIGS. 10-13 illustrates four states a novel circuit that has been developed to regenerate and recycle the leakage current from a capacitor or capacitor array, C1.

In FIGS. 10-13, the following components are described. C1 is a capacitor or capacitor array that is capable of storing a certain amount of charge. It displays a leakage of current when subjected to a given voltage (V+). C2 is a capacitor (e.g., much smaller than C1) of good storage characteristics that displays a much lower leakage current (or could be the same leakage current, but of much smaller area of capacitance). D1 is a diode that has the characteristic of being able to "block" the voltage from C1 from returning to Vss. When the voltage output from transformer T1's secondary coil exceeds the voltage present on C1 and the forward voltage drop of D1, then current will conduct to the C1 capacitor(s). S1 is a three position single pole switch. Line CL is a control line that controls S1. S1 is switch that is able to electrically connect the high voltage side of C1 to the charging voltage, V+. In one position it is connected to V+ and in the other position it is an open connection (NC) or connected to the load (LOAD). S2 and S3 are electrically controlled switches that have the ability to switch between two different outputs. These switches do not necessarily need to be high voltage switches able to withstand V+. T1 is a "flyback" type of transformer or an equivalent inductor that has the capability of withstanding a voltage on the secondary winding that is as great or greater than V+. V+ is a charging voltage that is connected to the main energy storage capacitor(s) C1 during the charge cycle. Vss is the lower voltage that is present on the opposite electrode of C1 from V+ that produces the potential difference between the two electrodes.

Using the multi-state electrical circuit of FIGS. 10-13, leakage current may be recovered and regenerated from a capacitor C1 according to principles of the invention. Referring to State A of the circuit diagram of FIG. 10, a current is shown flowing from the V+ source through S1 to the positive plate of C1. In this situation S2 is connected to Vss such that the charge can be accumulated on C1 to the potential difference between the two. The status of S3 does not matter at this state and no current is flowing in the lower part of the circuit.

Figure 11:
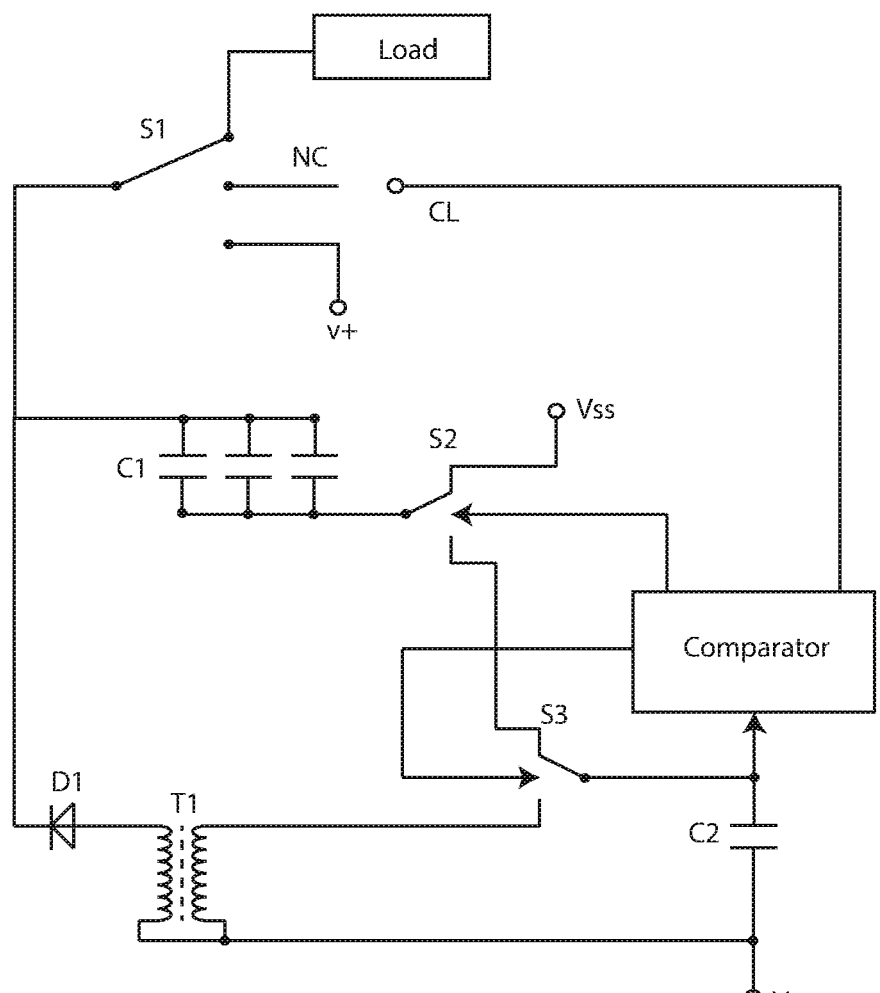
FIG. 11 conceptually illustrates a multi-state electrical circuit diagram in accordance with one or more embodiments of the present disclosure for the recovery of leakage current from an energy storage capacitor.

In State B of the circuit diagram of FIG. 11, V+ has been disconnected from the positive electrode of C1 and the other electrode of C1 is connected to ground through S2. This illustrates a typical situation where the stored load of the C1 capacitor is being used through the S1 switch to power an electrical load.

Figure 12:
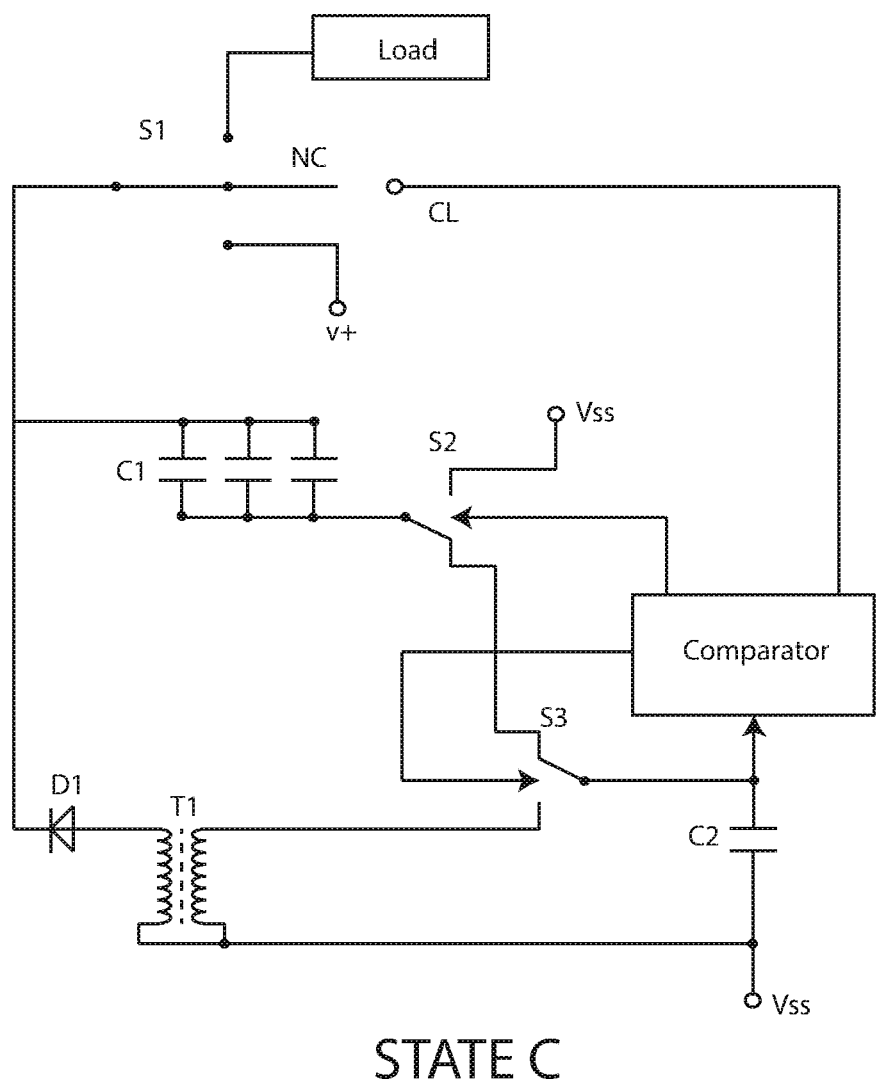
FIG. 12 conceptually illustrates a multi-state electrical circuit diagram in accordance with one or more embodiments of the present disclosure for the recovery of leakage current from an energy storage capacitor.
Figure 13:
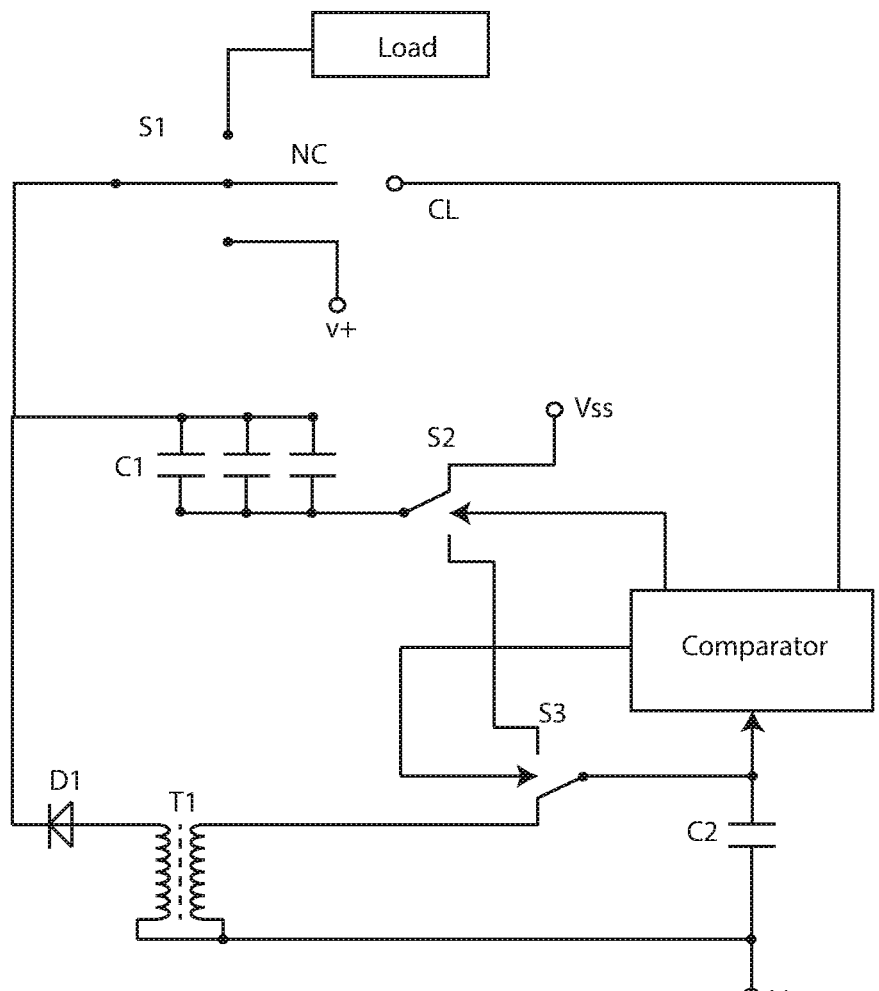
FIG. 13 conceptually illustrates a multi-state electrical circuit diagram in accordance with one or more embodiments of the present disclosure for the recovery of leakage current from an energy storage capacitor.

In States C and D of the circuit diagram of FIGS. 12 and 13, two states are shown where the C1 storage capacitor is not being charged or discharged. However, due to the leakage current from one electrode to another, there is a current flowing through the non-ideal C1 component to C2 through the S2 switch. This current will charge C2 to some voltage at a rate based upon the relative capacitances of C1 and C2 and the rate of leakage. The switch S2 is disconnected from ground and connected to the input of C2. While in State C, the C2 capacitor is charged to some predetermined voltage (V1). At that predetermined voltage, the comparator then disconnects C2 from C1's open "Vss" electrode using S2, and S2 connects to "Vss", and then subsequently connects the positive electrode of C2 to the input of T1 transformer using S3, as shown in State D of FIG. 13. This discharge current through T1 induces a voltage on the secondary of T1 that rises to a voltage value sufficient to return some of the charge to C1 through the diode D1. Once the discharge of C2 is complete as determined by the comparator's determination of voltage on the positive electrode of C2, the comparator returns all the switches to State C unless a demand is made to charge or discharge C1.

In the above-described operation, a relatively "leaky" capacitor can return some of the charge loss through the C1's leakage when C1 is not in use during either a charge or discharge period of time. Due to the efficiency of the circuit (which can be made to be >90% efficiency), the leakage from the C1 device is effectively reduced by a factor of up to 9 times. For production of a large array of capacitors, this can be a significant improvement in yield. Often there are unwanted impurities in the material that increase the leakage current, and these are often not detected until the entire assembly has been completed. In the case of a large array capacitor, this amounts to a significant number of good devices being rejected due to a relatively small number of failures in the array.

As the graph in FIG. 14 shows, a voltage charges one electrode of the energy storage device, while a voltage is generated by the other electrode that is series connected to ground through a 10K resistor. As the device charges, there is a rapid charging of the electrode and low impedance due to the capacitance of the device. The capacitance modes of charging are much faster than the Helmholtz layer formations, but ultimately much less charge is stored by these mechanisms for energy storage than by the DH layer formations.

Referring now to FIG. 14, energy and voltages over time for an exemplary energy storage device according to principles of the invention are conceptually illustrated. The energy storage device is a capacitor that charges through a resistor coupled to a 120 VDC source. Connection of a PicoScope™ Model 4262 to each electrode of the capacitor and utilization of the scope's integrated math functions allow calculation and display of the energy flowing into the circuit as shown by trace 405. The applied voltage to the first electrode is represented by trace 415A-415B, and the displacement current is represented by the trace 410. The first charging voltage of approximately 120V supplies 8.16 J to the capacitor. The second voltage of −120 VDC applied at approximately the 3 minute mark shows an energy delivery of 8.08 J. In this particular charge sequence the amount of charge and discharge are approximately equal. Integration of the displacement current across the capacitor reveals that the energy absorbed and the energy discharged are approximately equal to within the error limits of the data acquisition device and integration routine. Longer charge cycles could be used, but essentially all of the energy supplied in this period of time at this voltage has been absorbed by the capacitor in this time frame. Some droop in the power supplies are present due to the low reactance of the capacitor during initial switching. This voltage drop is accounted for in the calculations of the scope. In this example, the energy absorbed is 8.16 J. The volume of sample is 0.006333 ml. The energy density is 1288 J/ml or 198 Wh/kg. Integration of the charge reveals that essentially a >90% recovery of the charge can be obtained when the discharge cycle is at least 10 times longer than the charge cycle.

In another example shown in Table 2 below, the charge stored is in the range of 0.41 Wh/kg at very low electric field magnitudes (0.34 V per micron).

TABLE 2

| q | C | A | d | v | E | Vol. | E/m³ | ρ | E/kg | E-field |
|---|---|---|---|---|---|------|------|---|------|---------|
| 776,000 | 25,876 | 50 | 87 | 30 | 1.16E−2 | 4.35E−9 | 2.68E+6 | 1.8 | 0.413 | 0.34 | q in (nA·s), C in μF, A in mm$^2$, d in μm, v in volts, E in J, Vol. in m$^3$, ρ in g/cm$^3$, E/kg in Wh/kg, E-field in V/μm.

Higher electric field magnitudes than noted in Table 2 above have been used. Devices charged with larger magnitude electric fields store more charge, and higher values for energy density per mass have been obtained.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A capacitor comprising:
   a first conductive electrode having a first outer side and an opposite first inner side;
   a first nonconductive coating on said first inner side of said first conductive electrode;
   a dielectric material on said first nonconductive coating, said first nonconductive coating being disposed between said first conductive electrode and said dielectric material;
   a second conductive electrode adjacent to said dielectric material, said dielectric material being disposed between said second conductive electrode and said first nonconductive coating; and
   said dielectric material being a variable viscosity dielectric material, said variable viscosity having a physical characteristic of exhibiting a change in viscosity in response to an external stimulus.

2. A capacitor according to claim 1, further comprising:
   a second nonconductive coating on said second conductive electrode and being disposed between said second conductive electrode and said dielectric material, said second nonconductive coating having a thickness that is less than ten percent of said overall thickness.

3. A capacitor according to claim 1, said external stimulus comprising a stimulus from the group consisting of a force, a pressure, a shear stress, a normal stress, heat, a magnetic field, and/or an electric field.

4. A capacitor according to claim 1, said dielectric material having a physical characteristic of increasing in viscosity as the external stimulus is applied and decreasing in viscosity as the external stimulus is removed.

5. A capacitor according to claim 1, said dielectric material having a physical characteristic of decreasing in viscosity as the external stimulus is applied and increasing in viscosity as the external stimulus is removed.

6. A capacitor according to claim 1, said dielectric material having a physical characteristic of releasing energy at a rate, said rate increasing as viscosity of the dielectric material decreases.

7. A capacitor according to claim 1, said dielectric material having a physical characteristic of releasing energy at a rate, said rate decreasing as viscosity of the dielectric material increases.

8. A capacitor according to claim 1, said dielectric material having a physical characteristic of receiving charge at a rate, said rate increasing as viscosity of the dielectric material decreases.

9. A capacitor according to claim 1, said dielectric material having a physical characteristic of receiving charge at a rate, said rate decreasing as viscosity of the dielectric material increases.

10. A capacitor according to claim 1, said first nonconductive coating comprising a condensed and polymerized xylylene monomer.

11. A capacitor according to claim 1, said first nonconductive coating comprising a p-xylylene polymer.

12. A capacitor according to claim 1, said first nonconductive coating comprising a metal oxide.

13. A capacitor according to claim 1, said dielectric material comprising a viscosity reducing agent, and said dielectric material having a viscosity, said dielectric material having a physical characteristic of exhibiting an increase in viscosity from a first viscosity to a second viscosity in response to an external stimulus, and exhibiting a decrease in viscosity from the second viscosity to the first viscosity upon removal of the external stimulus.

14. A capacitor according to claim 13, said external stimulus selected from the group consisting of a controllable heat source, a controllable cooling source, a controllable magnetic field generator, a controllable electric field generator, a controllable force generator, a controllable pressure generator, and a controllable shear stress generator.

15. A capacitor according to claim 1, said dielectric material comprising a viscosity increasing agent, and said dielectric material having a viscosity, said dielectric material having a physical characteristic of exhibiting a decrease in viscosity from a first viscosity to a second viscosity in response to an external stimulus, and exhibiting an increase in viscosity from the second viscosity to the first viscosity upon removal of the external stimulus.

16. A capacitor according to claim 15, said external stimulus selected from the group consisting of a controllable heat source, a controllable cooling source, a controllable magnetic field generator, a controllable electric field generator, a controllable force generator, a controllable pressure generator, and a controllable shear stress generator.

17. A capacitor according to claim 1, said dielectric material comprising a dielectric substance selected from the group consisting of a conductive polymer, a nonconductive polymer, an inorganic metal oxide, a metal oxide mixture, a biopolymers, a viscoelastic.

18. A capacitor according to claim 1, said dielectric material comprising an electro-rheological dielectric substance.

19. A capacitor according to claim 1, said dielectric material comprising a magneto-rheological dielectric substance.

* * * * *